US008849950B2

(12) United States Patent
Stockhammer et al.

(10) Patent No.: US 8,849,950 B2
(45) Date of Patent: Sep. 30, 2014

(54) NETWORK STREAMING OF VIDEO DATA USING BYTE RANGE REQUESTS

(75) Inventors: Thomas Stockhammer, Bergen (DE); Donald W. Gillies, San Diego, CA (US); Michael G. Luby, Berkeley, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 13/439,556

(22) Filed: Apr. 4, 2012

(65) Prior Publication Data
US 2012/0259946 A1 Oct. 11, 2012

Related U.S. Application Data

(60) Provisional application No. 61/473,105, filed on Apr. 7, 2011.

(51) Int. Cl.
*G06F 15/16* (2006.01)
*H04L 29/06* (2006.01)

(52) U.S. Cl.
CPC .......... *H04L 65/105* (2013.01); *H04L 65/1069* (2013.01); *H04L 65/608* (2013.01)
USPC .......................................... 709/217; 709/231

(58) Field of Classification Search
None
See application file for complete search history.

(56) References Cited

U.S. PATENT DOCUMENTS

| | | | | |
|---|---|---|---|---|
| 6,889,256 | B1 * | 5/2005 | Palevich et al. | 709/229 |
| 7,110,962 | B2 * | 9/2006 | Amon et al. | 705/14.73 |
| 2003/0055995 | A1 * | 3/2003 | Ala-Honkola | 709/231 |
| 2005/0102371 | A1 | 5/2005 | Aksu | |
| 2005/0254575 | A1 * | 11/2005 | Hannuksela et al. | 375/240.1 |
| 2007/0204115 | A1 | 8/2007 | Abramson | |
| 2008/0022005 | A1 * | 1/2008 | Wu et al. | 709/231 |
| 2010/0011091 | A1 * | 1/2010 | Carver et al. | 709/219 |
| 2010/0235472 | A1 * | 9/2010 | Sood et al. | 709/219 |
| 2010/0318600 | A1 | 12/2010 | Furbeck | |
| 2011/0096828 | A1 | 4/2011 | Chen et al. | |
| 2011/0239078 | A1 | 9/2011 | Luby et al. | |

FOREIGN PATENT DOCUMENTS

WO    WO 2011038034 A1 *  3/2011   ............... H04N 7/24

OTHER PUBLICATIONS

"Choosing Between Multiple Content Delivery Networks and Load Balancing (Part IV)": Cotendo's CDN Balancer (web page), CDN Expert Online, Dec. 22, 2009.
3GPP TS 26.234 V9.1.0 ,"3rd Generation Partnership Project; Technical Specification Group Services and System Aspects; Transparent end-to-end Packet-switched Streaming Service (PSS); Protocols and codecs (Release 9)", Dec. 2009, 179 pages.

(Continued)

*Primary Examiner* — Jason K. Gee
*Assistant Examiner* — Maung Lwin
(74) *Attorney, Agent, or Firm* — Shumaker & Sieffert, P.A.

(57) ABSTRACT

In one example, a device for receiving information for multimedia data includes one or more processors configured to determine a byte range of a file of a representation of multimedia content to request from a source device, form a uniform resource locator (URL) that specifies, in a file path portion of the URL, according to a template, the file and the byte range in accordance with requirements of the source device, and issue a GET request that specifies the formed URL to the source device.

52 Claims, 9 Drawing Sheets

(56) References Cited

OTHER PUBLICATIONS

3GPP TS 26.247 version 10.0.0 Release 10, "Universal Mobile Telecommunications System (UMTS);LTE;Transparent end-to-end Packet-switched; Streaming Service (PSS);Progressive Download and Dynamic; Adaptive Streaming over HTTP (3GP-DASH)", year 2011.
Anawat Chankhunthod, et al. : "A Hierarchical Internet Object Cache". USENIX Annual Technical Conference 1996: 153-164.
Bernie Arnason, "Report: Netflix Represents 30% of Peak Internet Traffic", Telecompetitor, May 17, 2011, Slide 1-6, http://www.telecompetitor.com/report-netflix-represents-30-of-peak-internet-traffic/.
Fielding, et al. "Hypertext Transfer Protocol-HTTP/1.1", pp. 1-6, 30-34, 152-154 (Jan. 1997).
HTTP Live Streaming "draft-pantos-http-live-streaming-04", Jun. 5, 2010.
International Organisation for Standardisation, ISO/IEC JTC1/SC29/WG11, Coding of Moving Pictures and Audio, MPEG2010 Geneva, Jan. 6, 2011, "WD 0.1 of 23001-6 Dynamic Adaptive Streaming over HTTP (DASH)," authors Stockhammer et al., 16 pp.
ISO/IEC JTC 1/SC 29; ISO/IEC FCD 23001-06, "Informational Technology—MPEG Systems Technologies—Part 6: Dynamic Adaptive Streaming Over HTTP", Jan. 28, 2011.
Luby, et al., "FLUTE—File Delivery over Unidirectional Transport", IETF RFC 3926, pp. 1-35, (Oct. 2004).
MS-SMTH: "IIS Smooth Streaming Transport Protocol" Sep. 8, 2009.
Nokia Corp., "Usage of 'mfra' box for Random Access and Seeking," S4-AHI127, 3GPP TSG-SA4 Ad-Hoc Meeting, Dec. 14-16, 2009, Paris, FR, 2 pp.
Peter B. Danzig, et al. "A Case for Caching File Objects Inside Internetworks". SIGCOMM 1993: 239-248.
Van Jacobson, et al., "Congestion Avoidance and Control" (1988). Proceedings of the Sigcomm '88 Symposium, vol. 18(4): pp. 314-329. Stanford, CA. Aug. 1988.
Wenger et al., "RTP Payload Format for H.264 Video," Network Working Group, RFC 3984, Feb. 2005, 78 pp.
3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.
Fielding et al., "RFC 2616: Hypertext Transfer Protocol HTTP/1.1", Internet Citation, Jun. 1999, pp. 165, XP002196143, Retrieved from the Internet: URL:http://www.rfc-editor-org/ [retrieved on Apr. 15, 2002].
International Standard ISO/IEC 14496-12, Information Technology—Coding of audio-visual objects—Part 12: ISO base media file format, Third Edition, Oct. 15, 2008, 120 pp.
Bross et al., "High efficiency video coding (HEVC) text specification draft 6," Joint Collaborative Team on Video Coding, JCTVC-H1003, Nov. 21-30, 2011, 259 pp.
Bross et al., "High efficiency video coding (HEVC) text specification draft 7," Joint Collaborative Team on Video Coding, JCTVC-I1003_D2, Apr. 27-May 7, 2012, 290 pp.
Bross et al., "High efficiency video coding (HEVC) text specification draft 8," Joint Collaborative Team on Video Coding, JCTVC-J1003_D7, Jul. 11-20, 2012, 261 pp.
Bross et al., "WD4: Working Draft 4 of High-Efficiency Video Coding," Joint Collaborative Team on Video Coding, JCTVC-F803_d2, Jul. 14-22, 2011, 226 pp.
Bross et al., "WD5: Working Draft 5 of High-Efficiency Video Coding," Joint Collaborative Team on Video Coding, JCTVC-G1103_d2, Nov. 21-30, 2011, 214 pp.
International Search Report and Written Opinion—PCT/US2012/032372—ISA/EPO—Aug. 1, 2012—12 pp.
International Telecommunication Union, "Advanced video coding for generic audiovisual services," Standardization Sector of ITU, Jun. 2011, 674 pp.
Realnetworks Inc., et al., "Format for HTTP Streaming Media Presentation Description", 3rd Generation Partnership Project, vol. SA WG4, Jan. 25-29, 2010, 12 pp.
Reply to Written Opinion dated Aug. 1, 2012, from international application PCT/US2012/032372, filed Jan. 23, 2013, 25 pp.
Wiegand et al., "WD2: Working Draft 2 of High-Efficiency Video Coding", Joint Collaborative Team on Video Coding, JCTVC-D503, Jan. 20-28, 2011, 153 pp.
Wiegand et al., "WD3: Working Draft 3 of High-Efficiency Video Coding," Joint Collaborative Team on Video Coding, JCTVC-E603, Mar. 16-23, 2011,193 pp.
Wiegand et al.,"WD1: Working Draft 1 of High-Efficiency Video Coding", Joint Collaborative Team on Video Coding, JCTVC-C403, Oct. 7-15, 2010, 137 pp.
Begen, A.C., et al., "Watching video over the web", IEEE Internet Computing, Mar. 1, 2011, 27 pp.
Bross et al., "High efficiency video coding (HEVC) text specification draft 6," 8th Meeting: San Jose, CA, USA, Feb. 1-10, 2012, JCTVC-H1003, 259 pp.
International Preliminary Report on Patentability from International Application No. PCT/US2012/032372, dated Sep. 10, 2013, 22 pp.
Second Written Opinion from International Application No. PCT/US2012/032372, dated Jul. 4, 2013, 6 pp.
Reply to Second Written Opinion from International Application No. PCT/US2012/032372, dated Aug. 1, 2013.

\* cited by examiner

NETWORK STREAMING OF VIDEO DATA USING BYTE RANGE REQUESTS

This application claims the benefit of U.S. Provisional Application No. 61/473,105, filed Apr. 7, 2011, which is hereby incorporated by reference in its entirety.

TECHNICAL FIELD

This disclosure relates to storage and transport of encoded multimedia data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

After video data has been encoded, the video data may be packetized for transmission or storage. The video data may be assembled into a video file conforming to any of a variety of standards, such as the International Organization for Standardization (ISO) base media file format and extensions thereof, such as the MP4 file format and the advanced video coding (AVC) file format. Such packetized video data may be transported in a variety of ways, such as transmission over a computer network using network streaming.

In the mid 2000's, the growth of video and audio traffic over the Internet via Real-time Transport Protocol (RTP) began to flood the Internet with a great deal of network traffic, and there were no congestion controls for these protocols. This led corporate information technology (IT) administrators to program their firewalls to block RTP packets containing video and audio streams that were choking the gateways at corporations.

The firewalls threatened existence of video and audio streaming services. Therefore, service providers began to provide content over TCP (more specifically, the HTTP port of TCP) virtual circuits. They did this to camouflage their video and audio traffic as useful HTTP traffic. IT firewall administrators could not easily block video and audio over HTTP/TCP, and so, for a while, video and audio over HTTP over TCP flourished.

Initially a "progressive download" method was used for download of most videos. In this mechanism, a single HTTP connection and transfer is used to download the entire video file. The user watches the download occur, and when they feel that enough data has been buffered to support the entire stream-viewing experience, they hit "PLAY" and begin to display the video. The player may start playout automatically once sufficient data is downloaded providing a pseudo-streaming experience. This method suffered from problems, however, when the user wanted to watch video right away, especially on low-capacity links. Another problem was that in a changing wireless environment, adaptive download could suddenly downshift to a snail's pace, causing stalls in the middle of a video.

Since 2005, work has been underway to implement Adaptive Streaming over HTTP, which attempts to address these problems. Examples of adaptive streaming protocols include Microsoft Smooth Streaming (MSS), Apple Live Streaming (ALS), Adobe HTTP Dynamic Streaming (AHDS), and the 3GPP Standard, Dynamic Adaptive Streaming over HTTP (DASH). In 2011, the Netflix video streaming service (based upon MSS) consumed 30% of the North American Internet backhaul at peak times, in the evening, delivering video packets to customer homes.

Adaptive streaming methods organize a video very much like an HTML web page. For example, in DASH, a "video web page" is defined to reference all of the "fragments" (sub-files, also referred to as sub-segments) that comprise the video. A fragment is typically 2 seconds of real-time video or audio, and it typically begins with an MPEG I-frame (essentially a full JPEG-encoded picture) in the case of video. In H.264/AVC such frames are referred to as Instantaneous Decoder Refresh (IDR) frames. In DASH a "video web page" is referred to as a "Media Presentation Description" (MPD). An MPD for a 2-hour video might reference 3600 video uniform resource locators (URLs), and 3600 audio URLs, each of which may correspond to 2 seconds of media when played back. And note that 3600 video URLs may be provided for each bit-rate at which the video is encoded.

One improvement of DASH is that the same video may be described at several different bit-rates, and the player can switch bit-rates (for example, every 2 seconds.) An MPD generally describes 3-8 different renderings of the same video, referred to as representations. When the Internet is congested, or when the terminal is on a low-capacity link, a low bit rate fragment may be fetched. When the Internet is uncongested and the terminal has a high-capacity link, a high bit rate fragment may be fetched. Typically, a single audio stream is fetched and no bit rate switching occurs with audio. When network or link conditions change, the player may adapt by fetching video fragments at higher or lower bit rates. The player typically adapts at the boundary of a fragment. Thus, the player may dynamically adapt to changing congestion conditions on the Internet, and transport both audio and video data over HTTP. Note that if 8 different representations are offered, a total of 3600*8=28,800 fragments may be managed on the origin sever.

After HTTP 0.9 was introduced in 1993, it became so successful that the Internet was soon choked with HTTP requests. Then in 1997, HTTP 1.0 was standardized in RFC 2068, which included caching. Browsers began to cache objects but also, researchers began to build transparent HTTP Proxy Cache devices to take advantage of new caching features in HTTP 1.0. A proxy cache device spies on HTTP GET requests and generally forwards the requests without changing them. When the proxy cache notices an HTTP response with one of ~5 HTTP "caching" headers (which means the content has a long lifetime and can be cached), such as a jpeg picture or a stock quote good for 20 minutes, the proxy cache device may store the cacheable response and replay it when the same or a different user requests the content later. A network administrator may reprogram switches or routers to route all HTTP traffic through their proxy cache.

In addition, HTTP 1.1 (as specified in RFC 2616) provides for partial GET requests. Partial GET requests include information specifying a target URL, as well as a "Range:" header followed by values indicative of a desired byte range. Despite provision by HTTP 1.1, not all web browsers implement the use of partial GET requests. Moreover, even when web browsers (or other applications executed by a client device) do implement partial GET requests, intermediate network devices, such as proxy servers, proxy cache devices, or other proxy devices, are often configured to retrieve the full file, not just the portion requested by the client device.

Proxy devices are commonly configured to perform additional actions on network traffic, such as deep packet inspection to detect viruses or other malicious network traffic, caching (to respond to other requests for the same data), or other functions requiring retrieval of the entire file. Therefore, such proxy devices tend to strip away the range request and retrieve the entire file at the specified URL, and thus, provide the entire retrieved file to the requesting client device. For example, certain virus scanning algorithms require scanning an entire file, in which case it is necessary to download the entire file. However, for a relatively large multimedia file (such as a two hour movie), retrieving the full file instead of the byte range requested may impose significant delays on transmission of the relatively small byte range to a requesting client device.

SUMMARY

In general, this disclosure describes techniques related to submitting byte range requests to stream media data over a network. Rather than submitting byte range requests using partial GET requests, the techniques of this disclosure are directed to specifying requested byte ranges in URLs of HTTP GET requests. In this manner, a byte range request need not specify a "Range:" header, thereby avoiding undesired behavior by intermediate proxy cache devices. That is, proxy cache devices that are configured to retrieve a full file, in response to receiving a partial GET request, should only retrieve the partial data of the requested URL. When the requested URL specifies a byte range, the retrieved data should be significantly smaller than the full file at the base URL.

In one example, a method of retrieving multimedia data includes determining a byte range of a file of a representation of multimedia content to request from a source device, forming a uniform resource locator (URL) that specifies, in a file path portion of the URL, the file and the byte range in accordance with requirements of the source device, and issuing a GET request that specifies the formed URL to the source device.

In another example, a device for retrieving information for multimedia data includes one or more processors configured to determine a byte range of a file of a representation of multimedia content to request from a source device, form a uniform resource locator (URL) that specifies, in a file path portion of the URL, the file and the byte range in accordance with requirements of the source device, and issue a GET request that specifies the formed URL to the source device.

In another example, a device for retrieving information for multimedia data includes means for determining a byte range of a file of a representation of multimedia content to request from a source device, means for forming a uniform resource locator (URL) that specifies, in a file path portion of the URL, the file and the byte range in accordance with requirements of the source device, and means for issuing a GET request that specifies the formed URL to the source device.

In another example, a computer program product includes a computer-readable storage medium comprising instructions that, when executed, cause a processor of a device for retrieving multimedia data to determine a byte range of a file of a representation of multimedia content to request from a source device, form a uniform resource locator (URL) that specifies, in a file path portion of the URL, the file and the byte range in accordance with requirements of the source device, and issue a GET request that specifies the formed URL to the source device.

In another example, a method of sending information for video data includes providing a manifest file for multimedia content, wherein the manifest file specifies a uniform resource locator (URL) template and a byte range template, wherein the URL template and the byte range template provide a template for forming a URL to include a byte range request within the URL, receiving a request including a URL constructed according to the URL template and the byte range template, wherein the URL of the request specifies a byte range of a representation of the multimedia content, and, in response to the request, outputting multimedia data of the representation corresponding to the byte range of the request.

In another example, a device for sending information for video data comprises one or more processors configured to provide a manifest file for multimedia content, wherein the manifest file specifies a uniform resource locator (URL) template and a byte range template, wherein the URL template and the byte range template provide a template for forming a URL to include a byte range request within the URL, receive a request including a URL constructed according to the URL template and the byte range template, wherein the URL of the request specifies a byte range of a representation of the multimedia content, and, in response to the request, outputting multimedia data of the representation corresponding to the byte range of the request.

In another example, a device for sending information for video data includes means for providing a manifest file for multimedia content, wherein the manifest file specifies a uniform resource locator (URL) template and a byte range template, wherein the URL template and the byte range template provide a template for forming a URL to include a byte range request within the URL, means for receiving a request including a URL constructed according to the URL template and the byte range template, wherein the URL of the request specifies a byte range of a representation of the multimedia content, and means for outputting, in response to the request, multimedia data of the representation corresponding to the byte range of the request.

In another example, a computer program product includes a computer-readable storage medium comprises instructions that cause a processor of a device for providing video data to provide a manifest file for multimedia content, wherein the manifest file specifies a uniform resource locator (URL) template and a byte range template, wherein the URL template and the byte range template provide a template for forming a URL to include a byte range request within the URL, receive a request including a URL constructed according to the URL template and the byte range template, wherein the URL of the request specifies a byte range of a representation of the multimedia content, and output, in response to the request, multimedia data of the representation corresponding to the byte range of the request.

The details of one or more examples are set forth in the accompanying drawings and the description below. Other features, objects, and advantages will be apparent from the description and drawings, and from the claims.

DETAILED DESCRIPTION

Figure 1:
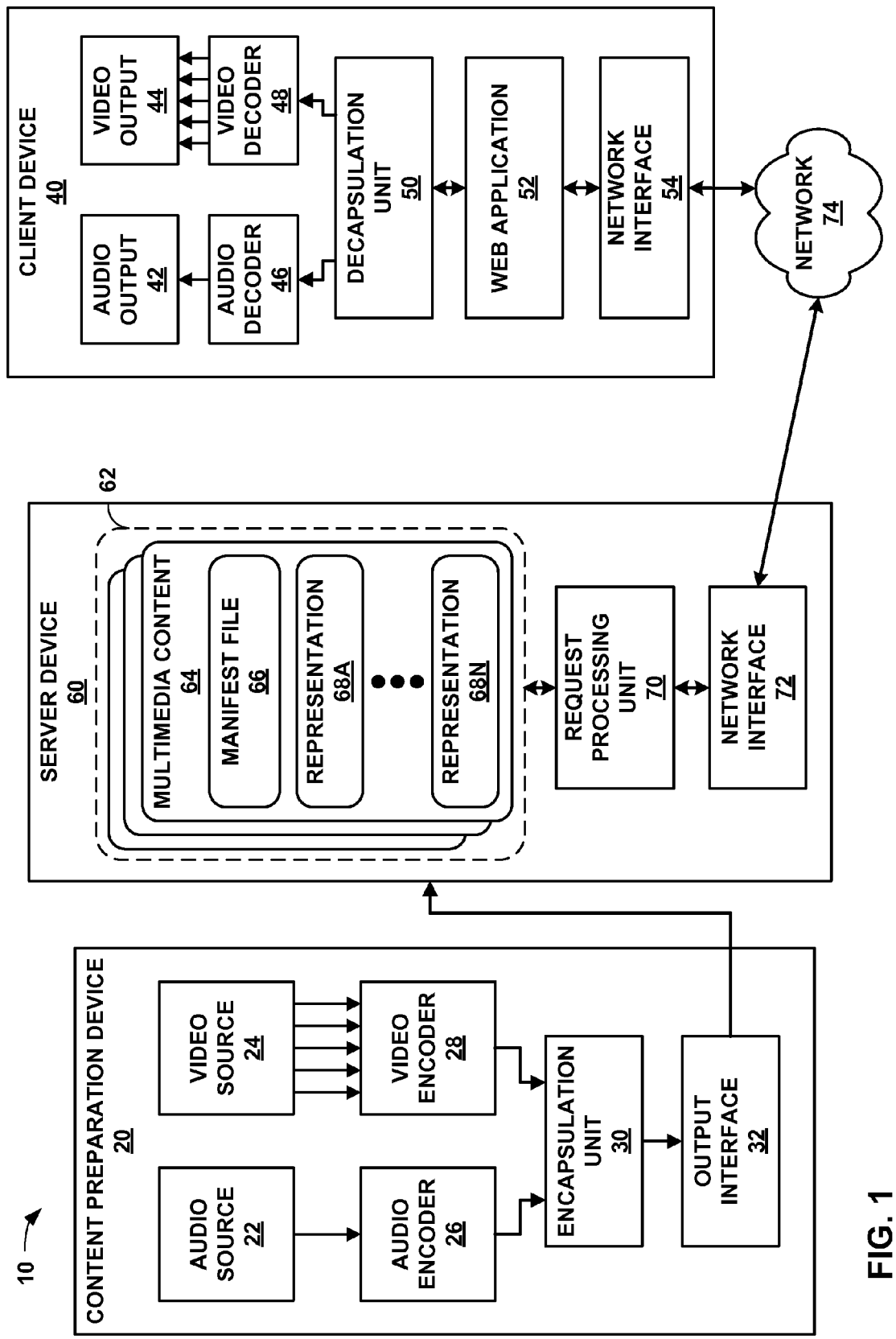
FIG. 1 is a block diagram illustrating an example system that implements techniques for streaming media data over a network.

In general, this disclosure describes techniques related to streaming of multimedia data, such as audio and video data, over a network. The techniques of this disclosure may be used in conjunction with dynamic adaptive streaming over HTTP (DASH). This disclosure describes various techniques that may be performed in conjunction with network streaming, any or all of which may be implemented alone or in any combination. As described in greater detail below, various devices performing network streaming may be configured to implement the techniques of this disclosure.

In accordance with DASH and similar techniques for streaming data over a network, multimedia content (such as a movie or other media content, which may also include audio data, video data, text overlays, or other data) may be encoded in a variety of ways and with a variety of characteristics. A content preparation device may form multiple representations of the same multimedia content. Each representation may correspond to a particular set of characteristics, such as coding and rendering characteristics, to provide data usable by a variety of different client devices with various coding and rendering capabilities. Moreover, representations having various bitrates may allow for bandwidth adaptation. That is, a client device may determine an amount of bandwidth that is currently available and select a representation based on the amount of available bandwidth, along with coding and rendering capabilities of the client device.

In some examples, a content preparation device may indicate that a set of representations has a set of common characteristics. The content preparation device may then indicate that the representations in the set form an adaptation set, also referred to as an adaptation set, such that representations in the set can be used for bandwidth adaptation. That is, representations in the set may differ in bitrate, but otherwise share substantially the same characteristics. In this manner, a client device may determine various sets of common characteristics for adaptation sets of multimedia content, and select an adaptation set based on coding and rendering capabilities of the client device. Then, the client device may adaptively switch between representations in the selected adaptation set based on bandwidth availability.

Data for the representations may be separated into individual files. Each of the files may be addressable by a particular uniform resource locator (URL). A client device may submit a GET request for a file at a particular URL to retrieve the file. In accordance with the techniques of this disclosure, the client device may modify the GET request by including an indication of a desired byte range within the URL path itself, e.g., according to a URL template provided by a corresponding server device. Note that in this disclosure, the term "path" may indicate either an HTTP abs_path [RFC2616] or HTTP rel_path [RFC2616][RFC2396]. The byte range indicates to the server device that only the indicated byte range is desired.

In this manner, the techniques of this disclosure include replacing conventional partial GET requests, and instead, specifying a desired byte range within the URL, e.g., in the URL path itself. For example, upon determining that a particular byte range of a URL-addressable file of a representation is desired, a client device may construct a GET request for the URL by specifying the desired byte range within the URL path, in accordance with the techniques of this disclosure. The manifest file creator may provide a template for constructing URLs in this manner, as well as provide information as to whether the template is required or optional. In addition, proxy devices or other intermediate network devices may be configured to convert received partial GET requests into modified URLs, in accordance with the techniques of this disclosure. In this manner, proxy devices that are configured to recognize partial GET requests may convert the partial GET requests in accordance with the techniques of this disclosure, to avoid having upstream proxy devices modify the partial GET request into a full GET request. Furthermore, server devices may be configured to respond not only to partial GET requests, but also to respond to modified URLs, and to specify how to construct such modified URLs that specify byte ranges of a file, in accordance with the techniques of this disclosure.

This disclosure also provides, in some examples, techniques for signaling characteristics of multimedia content related to byte ranges specified explicitly within a URL. This disclosure provides an enumerated attribute forming part of the MPD file, labeled "MustUseRangeURL." The value for a field corresponding to the attribute indicates whether a client device may (or must) specify a desired byte range in the URL itself. This disclosure also provides an enumerated attribute forming part of the MPD file, labeled "AllowedByteRanges." Requestable byte ranges may be specified within the MPD file, within a segment index (SIDX) box of a representation, or may be unspecified. The AllowedByteRanges attribute provides an indication of whether a client device may request byte ranges as specified by the MPD file, the SIDX box, or other data structures of multimedia content.

This disclosure further provides a ByteRangeTemplate field that indicates how the byte range is to be specified. The ByteRangeTemplate field may include a $URL$ field, a $StartByte$ field, and an $EndByte$ field, which may be ordered according to a properly-formed modified URL that also specifies a byte range. The ByteRangeTemplate field may further specify additional characters, such as forward-slashes or periods or other ASCII symbols. Using the ByteRangeTemplate, the client device (or proxy device) may convert a partial GET request (which includes a "Range:" field) to a modified URL that specifies a byte range without the use of a "Range:" field in accordance with the techniques of this disclosure.

Suppose, for example, that a web server provides multimedia content (e.g., the movie "TRON") either using byte ranges or by serving range requests where the range is embedded in the URL. The Webserver is www.example.com, in this example. The web server may provide the following indications in the MPD (or manifest file) for the multimedia content "TRON:"

URLTemplate="http://www.example.com/TRON/segment.$Bandwidth$. $Index$:"
ByteRangeTemplate="$Url$/$StartByte$/$EndByte$"
MustUseRangeURL=1 (=ByteRangeTemplateOptional)
AllowedByteRanges=0 (=RangesOnlyFromMPD)

In this example, the MPD file indicates the byte range template is the URL, followed by a slash and the starting byte in the desired byte range, followed by another slash and the ending byte in the desired byte range. The MustUseRangeURL indicates that the byte range template is optional, meaning that the server will respond to HTTP 1.1 partial GET requests as well as modified URLs including range requests, and the AllowedByteRanges field indicates that only byte ranges explicitly indicated in the MPD are permitted to be specified.

Continuing with this example, a conventional URL and byte range may be expressed according to HTTP 1.1 as the following partial get request:
GET http://www.example.com/TRON/segment.1000.27 HTTP/1.1
Host: www.example.com
Range: 435291-560829

A client device (or proxy device) in accordance with the techniques of this disclosure may modify the above partial GET request to form the following modified URL:
GET http://www.example.com/TRON/segment.1000.27/435291/560829 HTTP/1.1
Host: www.example.com In general, the client device may generate this example request, rather than generating a conventional partial GET request. In this example, the URL explicitly specifies the desired byte range (which is presumed to be specified in the MPD for the multimedia content, for purposes of example).

This disclosure also proposes the use of an extension header for HTTP that indicates that a URL includes a byte range. This may allow a proxy device to determine when a URL includes a byte range, such that the proxy device can pre-fetch data for the multimedia content for the client device that provided the request.

This disclosure also provides techniques for selecting a content distribution network (CDN) or content server farm. In some examples, the client device may issue a POST request to a redirection URL, included in the body of the request a BaseURL. A redirection server device may receive the POST and issue a request for the file corresponding to the BaseURL to a selected CDN, e.g., based on characteristics of the requesting client device, such as the client device's location browser type, network geography, or other selection criteria as discussed below. In other examples, selection criteria may be specified by a plurality of CDNs, such as time of day, round trip delay, hop count, location, and the like. A client device may use these criteria to select a CDN. The selection may be made randomly based on the criteria, or by measuring network characteristics corresponding to the selection criteria and use these criteria to deterministically select a CDN.

In general, the techniques of this disclosure may be used to overcome one or more problems related to streaming of multimedia data, especially with respect to requesting portions (e.g., fragments or sub-segments) of multimedia content. These problems include that not all browsers implement byte range requests. Because the byte range is not part of the URL specification—in fact, the "Range:" header is an optional header sent separately from the URL—HTML web pages are unable to reference byte ranges, and therefore, browsers need not implement byte range requests. In browsers that do implement byte range requests, such browsers might not allow a plug-in, such as a video plug-in, to issue a byte-range request. This problem has been an issue in the design of browser plug-ins, such as the Adobe PDF Reader plug-in. If plug-ins for a browser cannot issue byte-range requests, then a DASH plug-in would be unable to fetch a range of bytes from an MPEG video file.

In addition, while it may be possible to distribute full MPEG video files to cooperating CDNs and retrieve partial MPEG files by issuing HTTP range requests to cooperating CDNs, the same is not so easy to do with proxy cache devices. Proxy cache devices are not required to implement byte range requests. Various proxy cache devices are typically administered by hundreds of different organizations, and there are dozens of different implementations, and so it is not possible to ensure that all proxy cache devices implement byte range requests. It is legal in HTTP 1.1 to respond to a byte range request with the full file. This may be because the browser ignores the byte range request, or it may be done intentionally. If a proxy cache implements a virus scanner, the scanner might convert a byte-range request into a full-file request, in order to retrieve everything and virus-scan it, before serving out the content as a byte-range result. A typical web request today might go through 3 or more proxy devices (origin server proxy cache, national backhaul proxy, local ISP proxy) and any single proxy device (or all of the proxy devices) could be configured to nullify the byte range request.

Moreover, relatively few proxy cache devices are sophisticated enough to reconstruct an MPEG file from a series of byte-range requests that occur over, e.g., a two-hour time period of a typical video. File reconstruction is difficult to implement, when very few browsers and only a subset of browser plug-ins can issue byte-range requests. It is far more likely that a cache will (a) not cache byte range requests at all, or (b) keep only the most recent byte-range request from a given file, or (c) treat each separate byte-range request as a separate file. In the last case, this would result in up to 72,000 fragments in the proxy cache for a 2-hour movie with 10 streams with 2-second fragments. The overhead of managing many thousand fragments for each movie might become too inefficient and burdensome for caching, in this case.

The techniques of this disclosure include a mechanism for streaming of multimedia content, e.g., multimedia content in accordance with the 3GPP DASH protocol, to issue byte-range requests within the URL that is fetched by the browser. These techniques also include, in some examples, a generic template that defines how byte ranges can be mapped into the URL, a way to express whether use of the template is required or merely permitted (that is, optional), a way to provide data from a client device to origin servers and proxy devices indicating that there is a byte range embedded in a URL, and a way to select a template based on CDN type for BaseURL and/or ByteRangeTemplateURL. Any or all of these techniques may be used alone or in combination.

Video files, such as segments of representations of media content, may conform to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. The ISO Base Media File format is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual presentations. The file structure may be object-oriented. A file can be decomposed into basic objects very simply and the structure of the objects is implied from their type.

Files conforming to the ISO base media file format (and extensions thereof) may be formed as a series of objects, called "boxes." Data in the ISO base media file format may be contained in boxes, such that no other data needs to be contained within the file and there need not be data outside of boxes within the file. This includes any initial signature required by the specific file format. A "box" may be an object-oriented building block defined by a unique type identifier and length. Typically, a presentation is contained in one file, and the media presentation is self-contained. The movie container (movie box) may contain the metadata of the media and the video and audio frames may be contained in the media data container and could be in other files.

A representation (motion sequence) may be contained in several files, sometimes referred to as segments. Timing and framing (position and size) information is generally in the ISO base media file and the ancillary files may essentially use any format. This presentation may be 'local' to the system containing the presentation, or may be provided via a network or other stream delivery mechanism.

When media is delivered over a streaming protocol, the media may need to be transformed from the way it is represented in the file. One example of this is when media is transmitted over the Real-time Transport Protocol (RTP). In the file, for example, each frame of video is stored contiguously as a file-format sample. In RTP, packetization rules specific to the codec used must be obeyed to place these frames in RTP packets. A streaming server may be configured to calculate such packetization at run-time. However, there is support for the assistance of the streaming servers.

The techniques of this disclosure may be applicable to network streaming protocols, such as HTTP streaming, e.g., in accordance with dynamic adaptive streaming over HTTP (DASH). In HTTP streaming, frequently used operations include GET and partial GET. The GET operation retrieves a whole file associated a given uniform resource locator (URL) or other identifier, e.g., URI. The partial GET operation receives a byte range as an input parameter and retrieves a continuous number of bytes of a file corresponding to the received byte range. Thus, movie fragments may be provided for HTTP streaming, because a partial GET operation can get one or more individual movie fragments. Note that, in a movie fragment, there can be several track fragments of different tracks. In HTTP streaming, a media representation may be a structured collection of data that is accessible to the client. The client may request and download media data information to present a streaming service to a user.

In the example of streaming 3GPP data using HTTP streaming, there may be multiple representations for video and/or audio data of multimedia content. The manifest of such representations may be defined in a Media Presentation Description (MPD) data structure. A media representation may correspond to a structured collection of data that is accessible to an HTTP streaming client device. The HTTP streaming client device may request and download media data information to present a streaming service to a user of the client device. A media representation may be described in the MPD data structure, which may include updates of the MPD.

Each period may contain one or more representations for the same media content. A representation may be one of a number of alternative encoded versions of audio or video data. The representations may differ by various characteristics, such as encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group, which may be indicated by a group attribute in the MPD. Representations in the same group are generally considered alternatives to each other. For example, each representation of video data for a particular period may be assigned to the same group, such that any of the representations may be selected for decoding to display video data of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL). The MPD may provide the identifiers for each segment. In some examples, the MPD may also provide byte ranges in the form of a range attribute, which may correspond to the data for a segment within a file accessible by the URL or URI.

Each representation may also include one or more media components, where each media component may correspond to an encoded version of one individual media type, such as audio, video, and/or timed text (e.g., for closed captioning). Media components may be time-continuous across boundaries of consecutive media segments within one representation. Thus, a representation may correspond to an individual file or a sequence of segments, each of which may include the same coding and rendering characteristics.

The techniques of this disclosure, in some examples, may provide one or more benefits. For example, these techniques may allow intermediate proxy nodes to cache byte range responses properly. These techniques may cause proxy nodes to properly cache requested byte ranges even when the proxy nodes are not configured to cache requested byte ranges but are configured to retrieve an entire file. To allow for such proper caching, the byte range may be incorporated into the file path portion of the URL. By incorporating the byte range into the file path, future requests for exactly the same byte range may be looked up properly (using the URL file path as a key) and produce a cache "hit." This may happen because the lookup is typically performed over the URL only (and does not include the Range: header as a search key.)

These techniques may also allow the origin server to store the video representations (of which there are typically 3 to 8) using one file per representation, rather than one file per 2-second fragment, while at the same time allowing these files to be cached by intermediate nodes. This may reduce the number of files on an origin server from 9600-28,800 down to 3-8, and may make the origin server significantly more efficient at storing and retrieving video files.

Furthermore, these techniques may provide advantages to caching servers (often, content-distribution proxies) that are configured according to methods used to incorporate byte ranges into the URL of the HTTP GET request. If these servers can recognize the request, they can reassemble the byte range fragments and store 3-8 files for a 2-hour video, just like the origin server. It is not uncommon for content distribution networks to deploy "content-specific applications" on these intermediate proxies to accomplish this custom-caching and retrieval policy. Therefore, this is a very practical and realizable benefit in the open Internet.

Moreover, these techniques may provide advantages when one video is cached by several different content distribution networks. Due to different policies or different abilities of "content-specific applications," the exact pattern of the byte range request within the URL may need to be different for different content distribution networks. The techniques described in this disclosure may facilitate this in an easy and natural way, and may allow the client device to embed byte range requests differently for different content distribution networks.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device. In some examples, content preparation device 20 may distribute prepared content to a plurality of server devices, including server device 60. Similarly, client device 40 may communicate with a plurality of server devices, including server device 60, in some examples.

As described in greater detail below, any or all of content preparation device 20, server device 60, and client device 40 may be configured to perform corresponding techniques of this disclosure. For example, server device 60 and/or content preparation device 20 may define a generic template and send data to client device 40, e.g., in response to a request from client device 40, informing client device 40 how to map byte ranges into a URL to request data from, e.g., server device 60. Likewise, client device 40 may submit a request to retrieve data from a URL, where the URL of the request includes a requested byte range in accordance with the generic template. Moreover, server device 60 and/or content preparation device 20 may provide information to client device 40 indicating whether use of the template is required or optional.

Figure 2:
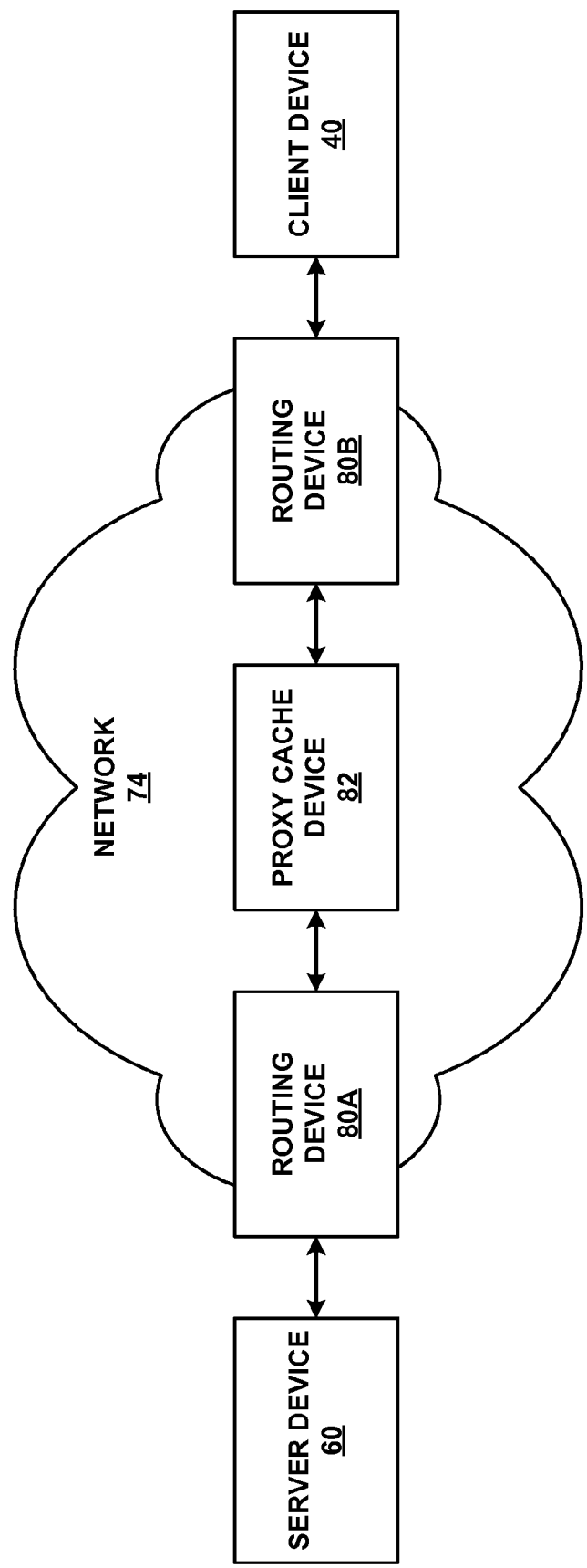
FIG. 2 is a block diagram illustrating an example set of devices that form part of the network of FIG. 1.
Figure 4:
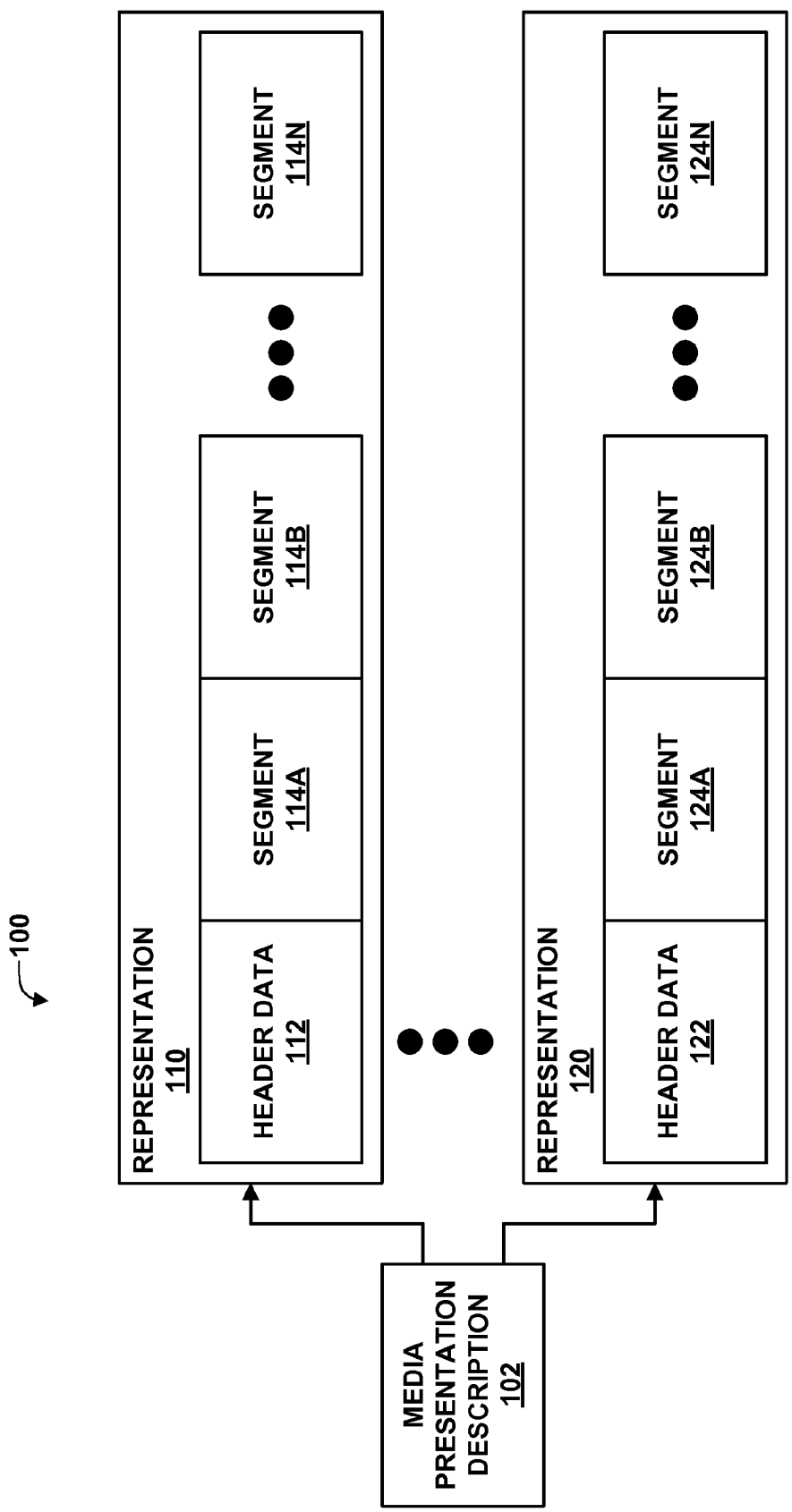
FIG. 4 is a conceptual diagram illustrating elements of an example multimedia content.

In addition, client device 40 may provide data to intermediate network devices (not shown in FIG. 1) that inform the intermediate network devices that there is a byte range embedded in a URL. The intermediate network devices may include proxy devices, routers configured to cache or inspect data, or the like, and may be included within network 74, as shown in FIG. 2, described in greater detail below. Furthermore, client device 40 may use a manifest file to determine techniques for selecting a content distribution network (CDN) from which to request data. Server device 60 represents an example of a server device that may be included in a CDN. Other server devices or intermediate network devices may be included within other CDNs, e.g., as shown in FIG. 4, described in greater detail below. In general, the CDN is typically chosen and configured by the entity that creates the manifest file (be in an HTML manifest file or a DASH MPD). In the case of HTML, CDN choice may be achieved by varying the hostname within URLs. In the case of DASH, a CDN may be chosen by a combination of hostname in URLs and CDN URL-pattern generation, in accordance with the techniques of this disclosure. In accordance with the techniques of this disclosure, each CDN may specify a template for generating byte range requests within a URL itself that are specific to the CDN.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

As with many video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile idc (profile indicator) value, while a level may be signaled with a level idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile. Various representations of multimedia content may be provided, to accommodate various profiles and levels of coding within H.264, as well as to accommodate other coding standards, such as the upcoming High Efficiency Video Coding (HEVC) standard.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a particular level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of blocks that need to be processed, decoded picture buffer (DPB) size, coded picture buffer (CPB) size, vertical motion vector range, maximum number of motion vectors per two consecutive MBs, and whether a B-block can have sub-block partitions less than 8×8 pixels. In this manner, a decoder may determine whether the decoder is capable of properly decoding the bitstream.

Video compression standards such as ITU-T H.261, H.262, H.263, MPEG-1, MPEG-2, H.264/MPEG-4 part 10, and the upcoming High Efficiency Video Coding (HEVC) standard, make use of motion compensated temporal prediction to reduce temporal redundancy. The encoder, such as video encoder 28, may use a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures may use the reference picture before the current picture in temporal order. In a B-picture, each block of the B-picture may be predicted from one or two reference pictures. These reference pictures could be located before or after the current picture in temporal order.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. Furthermore, the use of parameter sets may enable out-of-band transmission of header information, avoiding the need for redundant transmissions to achieve error resilience. In out-of-band transmission, parameter set NAL units are transmitted on a different channel than the other NAL units.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise a combination of audio data and video data, e.g., one or more audio elementary stream and one or more video elementary streams. Each PES packet may include a stream id that identifies the elementary stream to which the PES packet belongs. Encapsulation unit 30 is responsible for assembling elementary streams into video files of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units.

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission, direct transmission, or storage media. In the example of FIG. 1, server device 60 includes storage medium 62 that stores various multimedia contents 64, each including a respective manifest file 66 and one or more representations 68A-68N (representations 68). In accordance with the techniques of this disclosure, portions of manifest file 66 may be stored in separate locations, e.g., locations of storage medium 62 or another storage medium, potentially of another device of network 74 such as a proxy device.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces, including network interface 72. Furthermore, any or all of the features of server device 60 may be implemented on other devices of a content distribution network, such as routers, bridges, proxy devices, switches, or other devices. In some examples, intermediate devices of a content distribution network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 72. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment. In some examples, byte ranges of a segment may be specified using partial GET requests. In other examples, in accordance with the techniques of this disclosure, byte ranges of a segment may be specified as part of a URL for the segment, e.g., according to a generic template.

Request processing unit 70 may further be configured to service HTTP HEAD requests to provide header data of a segment of one of representations 68. In any case, request processing unit 70 may be configured to process the requests to provide requested data to a requesting device, such as client device 40. Furthermore, request processing unit 70 may be configured to generate a template for constructing URLs that specify byte ranges, provide information indicating whether the template is required or optional, and provide information indicating whether any byte range is acceptable or if only a specific set of byte ranges is permitted. When only specific byte ranges are permitted, request processing unit 70 may provide indications of the permitted byte ranges.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68. In conventional DASH, there are two ways to specify byte ranges. The first way is to explicitly put byte ranges into the individual fragment definitions, storing the byte ranges in the MPD XML. The second way is to fetch the byte range information from the SIDX box in the MPEG file, and use that SIDX byte range information to issue byte range requests for media. The byte ranges discussed above may be specified using either of these techniques, or other techniques, as will be understood by those of skill in the art.

Web application 52 of client device 40 may comprise a web browser executed by a hardware-based processing unit of client device 40, or a plug-in to such a web browser. References to web application 52 should generally be understood to include either a web application, such as a web browser, a standalone video player, or a web browser incorporating a playback plug-in to the web browser. Web application 52 may retrieve configuration data (not shown) of client device 40 to determine decoding capabilities of video decoder 48 and rendering capabilities of video output 44 of client device 40.

The configuration data may also include any or all of a language preference selected by a user of client device 40, one or more camera perspectives corresponding to depth preferences set by the user of client device 40, and/or a rating preference selected by the user of client device 40. Web application 52 may comprise, for example, a web browser or a media client configured to submit HTTP GET and partial GET requests. Web application 52 may correspond to software instructions executed by one or more processors or processing units (not shown) of client device 40. In some examples, all or portions of the functionality described with respect to web application 52 may be implemented in hardware, or a combination of hardware, software, and/or firmware, where requisite hardware may be provided to execute instructions for software or firmware.

Web application 52 may compare the decoding and rendering capabilities of client device 40 to characteristics of representations 68 indicated by information of manifest file 66. Web application 52 may initially retrieve at least a portion of manifest file 66 to determine characteristics of representations 68. For example, web application 52 may request a portion of manifest file 66 that describes characteristics of one or more adaptation sets. Web application 52 may select a subset of representations 68 (e.g., an adaptation set) having characteristics that can be satisfied by the coding and rendering capabilities of client device 40. Web application 52 may then determine bitrates for representations in the adaptation set, determine a currently available amount of network bandwidth, and retrieve segments (or byte ranges) from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, web application 52 may retrieve data from relatively high bitrate representations, whereas when available network bandwidth is low, web application 52 may retrieve data from relatively low bitrate representations. In this manner, client device 40 may stream multimedia data over network 74 while also adapting to changing network bandwidth availability of network 74.

As noted above, in some examples, client device 40 may provide user information to, e.g., server device 60 or other devices of a content distribution network. The user information may take the form of a browser cookie, or may take other forms. Web application 52, for example, may collect a user identifier, user identifier, user preferences, and/or user demographic information, and provide such user information to server device 60. Web application 52 may then receive a manifest file associated with targeted advertisement media content, to use to insert data from the targeted advertisement media content into media data of requested media content during playback. This data may be received directly as a result of a request for the manifest file, or a manifest sub-file, or this data may be received via an HTTP redirect to an alternative manifest file or sub-file (based on a supplied browser cookie, used to store user demographics and other targeting information).

At times, a user of client device 40 may interact with web application 52 using user interfaces of client device 40, such as a keyboard, mouse, stylus, touchscreen interface, buttons, or other interfaces, to request multimedia content, such as multimedia content 64. In response to such requests from a user, web application 52 may select one of representations 68 based on, e.g., decoding and rendering capabilities of client device 40. To retrieve data of the selected one of representations 68, web application 52 may sequentially request specific byte ranges of the selected one of representations 68. In this manner, rather than receiving a full file through one request, web application 52 may sequentially receive portions of a file through multiple requests. In accordance with the techniques of this disclosure, web application 52 may form requests including a URL that specifies the byte ranges, e.g., according to a template.

In some examples, server device 60 may specify a generic template for URLs from client devices, such as client device 40. Client device 40, in turn, may use the template to construct URLs for HTTP GET requests. In the DASH protocol, URLs are formed either by listing them explicitly within each segment, or by giving an URLTemplate, which is a URL containing one or more well-known patterns, such as $$, $RepresentationID$, $Index$, $Bandwidth$, or $Time$ (described by Table 9 of the present draft of DASH.) Before making a URL request, client device 40 may substitute text strings such as '$$', the representation id, the index of the segment, etc., into the URLTemplate to general the final URL to be fetched. This disclosure defines several additional XML fields that may be added to the SegmentInfoDefault element of a DASH file, e.g., in an MPD for multimedia content, such as manifest file 66 for multimedia content 64.

In some examples, server device 60 may provide data that expresses usage of the generic template, e.g., whether the template is required or optional, in a first field. For example, server device 60 (or a proxy device) may provide information to client device 40 indicating whether client device 40 is required, or simply permitted, to use the template. Server device 60 may set a value of an element in manifest file 66 to indicate usage of the template. For example, an MPD file (representing an example of manifest file 66) may include a field labeled "MustUseRangeURL," which may take one of three values: DoNotIncorporateByteRangeIntoUrl(0), ByteRangeTemplateOptional(1), or ByteRangeTemplateMandatory(2). In some examples, if server device 60 sets the value to zero, fetched URLs must not contain byte ranges and the ByteRangeTemplate must not be used. In some examples, server device 60 sets the value is one, at its own option, a DASH player (e.g., web application 52) may issue regular byte range requests, or it may embed the byte ranges within the URL itself. In some examples, if server device 60 sets the value to two, the DASH player must issue byte range requests within the URL.

Another field provided by this disclosure is an enumerated attribute, "AllowedByteRanges" which can also take one of three values. The first value is RangesOnlyFromMPD(0). When server device 60 specifies this value, the DASH player (e.g., web application 52) is not allowed to use byte ranges from the SIDX (which may be included within data of a respective one of representations 68). Accordingly, the DASH player may be restricted to only use byte ranges from the DASH MPD, e.g., manifest file 66. The second value is RangesFromSIDX(1). When server device 60 specifies this value, the DASH player may only use byte ranges from the SIDX (which again, may be included as data within a segment of a respective one of representations 68) to generate fragment or segment requests. The third value, RangesFromAnywhere(3), allows arbitrary byte range requests, including an ability to use the SIDX or the MPD, and to combine two or more fragments in a segment request, to request two or more segments at once, or other hybrids of requests for one or more segments or portions of segments, in a byte range request.

Yet another field provided by this disclosure is the ByteRangeTemplate field. Server device 60 may provide data for this field. In accordance with the techniques of this disclosure, the ByteRangeTemplate may specify a string pattern that includes the fields $Url$, $StartByte$, and $EndByte$. In addition, the ByteRangeTemplate can contain extra ASCII characters to be added to issue URL-based byte-range requests, or it may include the symbol "$$," which stands for a single dollar sign, as in the URLTemplate element. Client device 40 may substitute data for each of the three fields of the ByteRangeTemplate. In particular, client device 40 may substitute a value into the $Url$ field corresponding to the value of the URLTemplate field. Client device 40 may also substitute the start and end bytes of the byte range to be requested into the resulting URL in the $StartByte$ and $EndByte$ fields. In this manner, client device 40 may produce a URL containing information for a byte-range request. Client device 40 may fetch data from this constructed URL via a GET request that contains no "Range:" field within it. That is, client device 40 may submit the GET request, including the produced URL, to server device 60.

It should be understood by someone skilled in the art, that it is immaterial whether the string patterns for a byte range template are stored in a ByteRangeTemplate attribute, or instead if they are stored in the URLTemplate. Storage of the string patterns for the template in the ByteRangeTemplate and URLTemplate attributes are provided merely for purposes of example. In general, these string patterns may be stored in either location, or elsewhere in the manifest file.

An example of requests specifying data for these fields is provided below. In this example, a web server (such as server device 60) serves out multimedia content (e.g., the movie "TRON") either using byte ranges or by serving range requests where the range is embedded in the URL. The Webserver may be, for example, www.mp4player.com. Presented below are values for this first example:

URLTemplate="http://www.mp4player.com/TRON/segment. $Bandwidth$. $Index$"
ByteRangeTemplate="$Url$/$StartByte$/$EndByte$"
MustUseRangeURL=1 (=ByteRangeTemplateOptional).
AllowedByteRanges=0 (=RangesOnlyFromMPD)

In this example, the web server at "www.mp4player.com" indicates that the byte range template is optional for client devices, by assigning a value of '1' to the element "MustUseRangeURL." That is, client device 40 may specify a byte range as part of a URL formed according to the URL template and the byte range template, or client device 40 may utilize a conventional partial GET request. If client device 40 elects to use the template, the client device would submit a request for the URL ("http://www.mp4player.com/TRON/segment.$Bandwidth$.$Index$") followed by a slash '/', a value for $StartByte$, another slash '/', and then a value for $EndByte$. Accordingly, client device 40 may construct an URL having two portions: a base portion corresponding to a particular representation and segment thereof, and a byte range portion that specifies a start byte and an end byte of a requested byte range. The byte range portion may essentially perform the function of a "Range:" header in a partial GET request, but is specified in the URL path itself, rather than as a "Range:" header. To a person skilled in the art, it should be evident that because the byte range is specified in the URL path, the results of the GET request are potentially cacheable by any intermediate devices, such as a transparent (or explicit) web proxy device. To a person skilled in the art, it should be clear that cacheable requests allow the video playback to be scaled to allow thousands or even millions of clients to request the same content at the same time. To a person skilled in the art, it should be evident that because the byte range is specified according to a template, which can be different for different content distribution network, the burden of getting different content distribution networks to adopt one and only one format, for byte-range-within-url-path requests, is relieved.

Moreover, in this example, the web server indicates that only byte ranges specified in the MPD can be specified, by assigning a value of '0' to the element "AllowedByteRanges." Therefore, whether the client device elects to specify byte ranges using the byte range template or as a partial GET request, the client device would only be permitted to specify byte ranges identified in the MPD file.

Assuming that a web browser executed by the client device (e.g., web application 52 of client device 40) supports byte range requests and supports them for plug-ins, a DASH plug-in may issue Byte Range requests using the Range: header of HTTP 1.1. Assuming a 1000 Kbps bitrate video with segment ID=27, a conventional partial GET request specifying a byte range may be as follows:

GET http://www.mp4player.com/TRON/segment.1000.27 HTTP/1.1
Host: www.mp4player.com
Range: 435291-560829

If the web browser does not allow its plug-ins to issue byte range requests, the request, in accordance with the example above, may be as follows:

GET http://www.mp4player.com/TRON/segment.1000.27/435291/560829 HTTP/1.1
Host: www.mp4player.com In this manner, the techniques of this disclosure may allow a web browser plug-in (such as web application 52), executed by a client device (such as client device 40), to issue byte range requests even when the browser involved does not allow the official HTTP 1.0 "Range:" header to be issued in the request header. Likewise, the web browser plug-in may use these techniques to issue the byte range request in this manner even if the web browser does not support byte range requests, e.g., to handle situations in which other network devices (such as intermediate network devices, e.g., routers) do not support or properly handle partial GET requests.

In response to requests submitted by web application 52 to server device 60, network interface 54 may receive and provide data of received segments of a selected representation to web application 52. Web application 52 may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, web application 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, web application 52, and/or decapsulation unit 50 may comprise an integrated circuit, a microprocessor, and/or a wireless communication device, such as a cellular telephone.

In this manner, client device 40 represents an example of a device for retrieving information for multimedia data that may include one or more processors configured to determine a byte range of a file of a representation of multimedia content to request from a source device, form a uniform resource locator (URL) that specifies, in a file path portion of the URL, the file and the byte range in accordance with requirements of the source device, and issue a GET request that specifies the formed URL to the source device.

Moreover, server device 60 represents an example of a device for sending information for video data that may include one or more processors configured to provide a manifest file for multimedia content, wherein the manifest file specifies a uniform resource locator (URL) template and a byte range template, wherein the URL template and the byte range template provide a template for forming a URL to include a byte range request within the URL, receive a request including a URL constructed according to the URL template and the byte range template, wherein the URL of the request specifies a byte range of a representation of the multimedia content, and, in response to the request, outputting multimedia data of the representation corresponding to the byte range of the request.

FIG. 2 is a block diagram illustrating an example set of devices that form part of network 74 of FIG. 1. In this example, network 74 includes routing devices 80A, 80B (routing devices 80) and proxy cache device 82. Routing devices 80 and proxy cache device 82 are intended to represent a small number of devices that may form part of network 74. Other network devices, such as switches, hubs, gateways, firewalls, bridges, and other such devices may also be included within network 74. Moreover, additional network devices may be provided along a network path between server device 60 and client device 40.

In general, routing devices 80 implement one or more routing protocols to exchange network data through network 74. In some examples, routing devices 80 may be configured to perform proxy or cache operations, such as the functionality attributed to proxy cache device 82 as described below. Therefore, in some examples, routing devices 80 may be referred to as proxy devices as well. In general, routing devices 80 execute routing protocols to discover routes through network 74. By executing such routing protocols, routing device 80B may discover a network route from itself to server device 60 via routing device 80A.

Accordingly, routing device 80B may receive network communications, such as TCP-IP encapsulated HTTP GET requests, from client device 40, destined for server device 60. In response to such communications, routing device 80B may determine a route to server device 60, and further, determine that the route includes proxy cache device 82. For example, proxy cache device 82 may comprise a "next hop" along the route, or one or more additional network devices may communicatively couple routing device 80B to proxy cache device 82. Proxy cache device 82 may also direct the communication to routing device 80A, which may forward the communication to server device 60.

Proxy cache device 82 may perform proxy caching functions. HTTP proxy caching is important for the Internet to operate. HTTP proxy cache devices, such as proxy cache device 82, may implement any or all HTTP protocol versions (e.g., HTTP 0.9, HTTP 1.0, and/or HTTP 1.1). Moreover, proxy cache devices, such as proxy cache device 82, may cache content based on the unique "Uniform Resource Locator" (URL) that appears in an HTTP GET request. This URL may be used as the key to subsequently look-up fetch requests in the cache. Proxy cache device 82 may be configured to cache segments or sub-segments of representations of multimedia content, which may correspond to a URL, such as a modified URL in accordance with the techniques of this disclosure.

In some examples, content distribution networks (CDNs) may be provided within, or communicatively coupled to, network 74. Examples of companies providing CDNs include Akamai, Level 3 Communications, and Limelight. Devices of CDNs may perform functions similar to proxy cache device 82. CDNs may station devices that are very similar to proxy cache devices at ISPs and at portals of national backhaul providers. For a fee, CDNs may distribute content or "prefill" proxy cache devices with a customer's content. The customer may then reference the content and through a technique generally known as DNS swizzling, a smart name server can direct a request for content to the nearest local CDN cache, saving valuable round-trip time when a web page is loading. Alternately, the customer may pay a different fee and the content may be cached only, having not been "prefilled" in advance.

As discussed above, streaming network protocols may provide a plurality of representations of the same multimedia content. Thus, although adaptive streaming protocols such as DASH allow adaptation, the benefit may come at a high cost. Multimedia content, which may represent tens, hundreds, thousands, millions, or greater numbers of bytes, may be encoded at, for example, eight different bit rates, and split into two-second segments, plus one or more audio streams (e.g., stereo or Dolby 5.1), which may also be split into pieces. Thus, a two-hour video may result in 3600 or more fragments, times 10 streams, the corresponding data may consume a great deal of directory storage in a proxy cache or a CDN.

To avoid the large amount of storage, server device 60 may be configured to receive individual files for each of the streams (e.g., ten files, in the example above). Client device 40 may retrieve segments or sub-segments, using HTTP GET or partial GET requests, or byte range requests specified in URLs of GET requests, in accordance with the techniques of this disclosure. In some examples, HTTP protocol stacks may be used by client device 40 to issue byte range requests. In this manner, a typical movie of, e.g., 36,000 fragments may be collapsed into ten files: 8 audio and 2 video. In accordance with the techniques of this disclosure, client device 40 may retrieve specific byte ranges of files using HTTP GET requests that include data representative of a URL that itself specifies a byte range.

In some cases, when a proxy device that does not properly handle the "Range:" header, but receives an HTTP 1.1 "Range:" header, the proxy device may ignore the header and fetch and serve out the entire files, rather than the requested portions of the files. This could be disastrous for a 2-hour MPEG video file, which may run to several gigabytes in size. A rate switch in the middle of such a stream might cause a proxy cache to begin fetching the entire file for the new rate, resulting in a delay (until at least half the data arrives at the cache, which is the earlier time that the cache can send back the content response.) This disrupts the intended purpose of partial GET requests, which is to retrieve small portions of a file in sequence to effect network streaming. To overcome this problem, this disclosure provides techniques for transparently embedding a byte range request into the URL, thereby bypassing a proxy cache that converts the "Range:" header requests into entire-file requests. Moreover, this disclosure also provides techniques for signaling that the origin server should look for the byte range request.

In particular, this disclosure provides techniques for signaling byte ranges through intermediate proxies that do not support byte range requests. That is, client device 40 may submit byte range requests such that the byte range requests are properly handled by intermediate network devices, such as routing devices 80 and proxy cache devices 82. As mentioned above, a web browser, such as web application 52 executed by client device 40, may embed a range request in a URL according to a byte range template not only in cases where the web browser does not implement (or does not allow plugins to utilize) byte range requests according to HTTP 1.1, but also to submit a range request when intermediate devices do not support or properly handle partial GET requests. Along the way, because the byte range is embedded in the URL, proxy devices, such as routing devices 80 and/or proxy cache device 82, may be able to store partial byte range responses, even when the proxy devices do not understand byte-range requests. Accordingly, future fetches of the exact same byte range should cause the proxy devices to correctly fetch the byte range of data from its cache.

This disclosure also provides a new "extension header" for HTTP. In general, HTTP allows user-defined extension headers in HTTP "GET" Requests and in HTTP responses. As defined in Section 7.1 of RFC 2616, "unrecognized header fields SHOULD be ignored by the recipient and MUST be forwarded by transparent proxies." These extension headers are parsed as entity-header fields that reduce to extension-header fields in the "GET" request. The extension header name is any unrecognized HTTP header (that is, any alphabetic token.) While the extension header can be any alphabetic token not-yet-defined by HTTP, typically in SMTP message headers, the prefix "X-" is guaranteed never to be used in any future version of SMTP, as defined in RFC822. The HTTP protocol itself is based on the header mechanisms defined in RFC822, and the "X-" convention is also used by HTTP proxies to identify non-HTTP extension headers which are typically forwarded—unchanged—to the origin server, and then forwarded back—to the client—unchanged.

This disclosure provides a new extension header called "X-Dash-ByteRange-URL," which only appears in HTTP GET requests. The prefix "X-" is used to avoid future conflicts with HTTP. The prefix "Dash-" signals that a DASH client is generating the header. One skilled in the art will see that the exact name of this header is not material; these techniques assume that client devices and server devices are configured according to a common name for an extension header.

This header provides information to intermediate nodes and proxy devices (that are configured to interpret the header) that a byte range is included in the HTTP GET request. This allows an origin server or CDN to store an MPEG file as a single file, and if it understands this header, it can use the "X-Dash-ByteRange-URL" header to determine that there is a byte range embedded in the URL.

Accordingly, client device 40 may provide the extension header in a range request, embedded within a URL of a GET request. Moreover, when proxy devices, such as routing devices 80 and/or proxy cache device 82, are configured to recognize the header, the proxy devices can retrieve and provide only the requested byte range to client device 40. Moreover, proxy cache device 82 and/or routing devices 80 may be configured to reassemble a file from a sequence of byte range requests for the same file. On the other hand, when the proxy devices, such as routing devices 80 and/or proxy cache device 82, are not configured to interpret the header, the proxy devices can simply pass a GET request including the header along toward server device 60.

The "X-Dash-ByteRange-URL" header can have a payload. Two examples of the payload are discussed below. In one example, the payload is empty. The presence of the byte range is signaled by the presence of the header. The byte range may always be appended to the end of the HTTP GET URL request. The origin server (e.g., server device 60) or proxy device (e.g., one of routing devices 80 or proxy cache device 82) may then search the URL from the last character and deduces a byte-range request of maximum length (e.g., using a search for the characters "0-9" and "-" and "," as defined by the byte range request specification in RFC 2616.)

The origin server or proxy device can then, in some examples, remove the byte range from the URL, open the file (using the URL with byte range removed), fetch the necessary bytes, and serve the bytes of the range back to client device 40. This design is backwards-compatible with intermediate proxies that do not implement the "X-Dash-ByteRange-URL" header, and these intermediate proxy devices will correctly cache the byte range and serve it to clients or client proxies on later requests. For example, proxy cache device 82 may be configured to recognize and handle the X-Dash-Byterange-URL header, whereas routing device 80B may not be configured to handle the X-Dash-Byterange-URL header. Nevertheless, routing device 80B may pass requests including this header to proxy cache device 82, and proxy cache device 82 may remove the header from such requests, retrieve the requested byte range, cache the data of the requested byte range, and provide the requested byte range to client device 40 via routing device 80B. Proxy cache device 82 may cache subsequent byte ranges of the same file, and in some examples, may reassemble a full file from a sequence of such byte range requests. In this manner, proxy cache device 82 may avoid loading the entire file before providing only the requested byte range to client device 40, which may otherwise cause a significant delay in transmission to client device 40.

Meanwhile, the origin server, e.g., server device 60, can keep an entire video stream in a single MPEG file, and it can service requests more efficiently and store the MPEG video more efficiently on the disk or in nonvolatile (e.g., FLASH) storage. For example, the following request may be used to retrieve a byte range of a video in accordance with the techniques of this disclosure:

GET http://www.example.com/movies/1984 TRON.1000.27123992-240211 host: www.example.com

X-Dash-ByteRange-URL

In another example, the payload of the X-Dash-ByteRange-URL header contains the actual byte range request specification from the URL itself. Thus, it works like a user-defined "Range:" header, but the behavior is different. An origin server, such as server device 60, may be configured to interpret an "X-Dash-ByteRange-URL" header with a payload, and match the payload of this header against the request URL. By computing a pattern match, the origin server can remove the byte-range specifier from the URL and form a new URL, which is used to fetch the full MPEG file from its disk or nonvolatile storage. The origin server may then use the byte range specification (again, using the same syntax as specified by RFC 2616) to extract the necessary bytes from the MPEG File. For example, the following request may be used to retrieve a byte range of a video in accordance with the techniques of this disclosure:

GET http://www.example.com/movies/123992-240211/ 1984_TRON.1000.27 host: www.example.com

X-Dash-ByteRange-URL: 123992-240211

The server, proxy, or CDN device (e.g., one of server device 60, routing devices 80, or proxy cache device 82) may then rewrite this request and serve out content as if the request had been made as a conventional partial GET request, e.g., as follows:

GET http://www.example.com/movies// 1984_TRON.1000.27 host: www.example.com

Range: 123992-240211

Note that on NFS and UNIX file systems, the presence of two or more "/" characters is treated the same as a single "/" character. There may be many benefits to this technique. A CDN or proxy device that is configured to implement this enhancement to HTTP can serve byte range requests from a single MPEG file, saving storage space on the disk. A smart proxy cache or CDN can even build up an MPEG file from a series of these range requests, combining all these range requests into a single cached file. For example, proxy cache device 82 may be configured to construct a full MPEG file, or other video file, from a plurality of sequential byte range requests, e.g., from client device 40 or other client devices.

There are other possible implementations, such as where a pattern is specified in the "X-Dash-ByteRange-URL" header, or in another extension header, to signal the presence of a byte range in the URL, which may be removed by the origin server. All such other implementations are also contemplated for implementing the techniques of this disclosure.

In this manner, proxy cache device 82 represents an example of a device for sending information for video data that may include one or more processors configured to provide a manifest file for multimedia content, wherein the manifest file specifies a uniform resource locator (URL) template and a byte range template, wherein the URL template and the byte range template provide a template for forming a URL to include a byte range request within the URL, receive a request including a URL constructed according to the URL template and the byte range template, wherein the URL of the request specifies a byte range of a representation of the multimedia content, and, in response to the request, outputting multimedia data of the representation corresponding to the byte range of the request.

Figure 3:
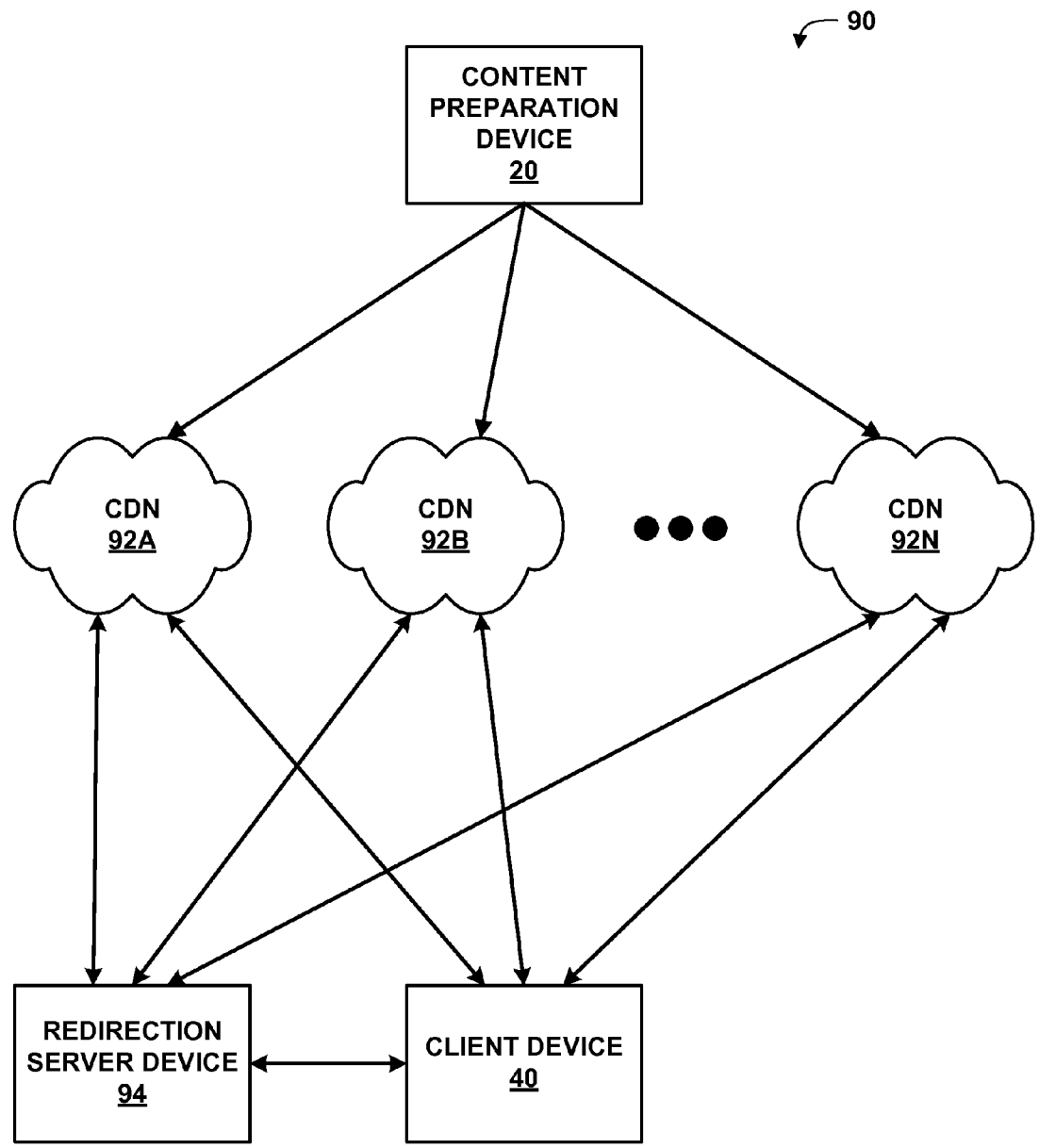
FIG. 3 is a block diagram illustrating an example system including various content distribution networks (CDNs).

FIG. 3 is a block diagram illustrating an example system 90 including various content distribution networks 92A-92N (CDNs 92). In this example, content preparation device 20 prepares multimedia content in a variety of representations, and provides one or more representations to each of CDNs 92. In some examples, each of CDNs 92 may receive the same representations, while in other examples, CDNs 92 may receive different sets of representations relative to the other CDNs 92. A server device similar to server device 60, as discussed with respect to FIGS. 1 and 2, may be provided in each of CDNs 92. Alternatively, a proxy or cache device may be provided in each of CDNs 92. Moreover, in some examples, some of CDNs 92 include server devices, while others of CDNs 92 include proxy devices. The term "CDN" is generally used in this disclosure to refer to a content delivery network, a content distribution network, a content server farm, or other similar facility. In accordance with the techniques of this disclosure, each of CDNs 92 may include a template for URLs that specify byte ranges that is specific to the respective CDN.

In some examples, certain ones of CDNs 92 are active only during certain times of the day, week, month, year, or other time period. For example, CDN 92A may be active during morning and afternoon hours, while CDN 92B may be active during evening and nighttime hours.

This disclosure provides techniques for selecting a CDN or content server farm, e.g., by client device 40, as described with respect to FIG. 3. It is assumed that a DASH MPD file includes data indicative of a series of BaseURLs, which are used to generate requests for DASH content. Moreover, it is assumed that each BaseURL refers to a unique CDN, e.g., a unique one of CDNs 92. Accordingly, a DASH player (executed by client device 40) may be configured to select an appropriate CDN, by selecting a corresponding BaseURL. In Table 1 below, a series of five selection criteria are shown that could be used to make the selection. There are other criteria that can be used (additionally or in the alternative), and these five are representative of a much wider set of possible selection criteria. Accordingly, additional or alternative selection criteria may be provided, relative to that shown in Table 1.

TABLE 1

Example CDN Selection Criteria

| Index | Name | Description |
| --- | --- | --- |
| 1 | Weighted Random | Optional list of weights summing to 1.0 |
| 2 | Time of Day | List of times in secs since midnight |
| 3 | Round Trip Delay | Specified in ms |
| 4 | Hopcount | Number of network device hops |
| 5 | Location | 3GPP name area, cell ID, zipcode, or the like |

In one example, client device 40 may select one of CDNs 92 by specifying a redirection URL, which names a redirection service. Redirection server device 94 represents a device, available at the redirection URL, that executes the redirection service. In this case, client device 40 may send a POST message to the redirection URL, causing the POST message to be directed to redirection server device 94. In the body of the message, client device 40 may specify a solitary BaseURL. Redirection server device 94 may then inspect the BaseURL, make a decision on which of CDNs 92 to use, and return a new BaseURL in the body of an HTTP response to client device 40. The decision can be based on concepts such as the location of the POSTing client device (a location protocol could map the client IP address to a location), the browser type (indicated in the POST request), network geography, and/or any of the selection criteria listed in Table 1, or similar criteria. Note that, rather than using a POST method, client device 40 could alternately use a GET method (sending content in the body of the GET method), and the redirection server could redirect the client device 40 directly to the first piece of content on the CDN directly, using an HTTP 301 (Content Moved) or 307 (Temporary Redirect) response.

In some cases the client might not be configured to act upon CDN selection information in the MPD, so it may post not only the BaseURL to the redirection server, but it may also post the selection criteria to the server, and thirdly, it may post all or some of its local information (such as geolocation information, hop counts, local time of day, etc.) to the redirection server device 94. In this case, the redirection server 94 may perform the entire decision-making process and return the BaseURL that should be used by the client device 40.

In addition, redirection service device 94 can be configured to analyze information that may depend upon the particular multimedia content that client device 40 requests to view. Some video titles are not necessarily available on each of CDNs 92. For example, certain content may not be available on a CDN in a certain country due to export or copyright restrictions. Such content-selection decisions can be made through implementation of this example. In the context of DASH, an optional attribute named "BaseURL@redirectionUrl," may contain the URL used for such POST requests via HTTP.

In other examples, a new DASH attribute, e.g., called BaseURL@selectionAttribute, may be used to indicate one or more selection attributes. That is, client device 40 may receive data for this attribute from a server or other device, e.g., a device of one of CDNs 92 or another device. The content of this attribute is a list of zero or more numbers, which may specify one or more selection criteria. In addition, certain numbers can have a series of arguments, with one argument for each BaseURL. In these examples, there need not be a redirectionURL. Moreover, no selectionAttribute needs to be specified. That is, by default, the selectionAttribute behavior is requested. In this case, a DASH player, executing on client device 40, may behave as if the selection criteria is "Weighted Random" with equal weights on all the possible BaseURLs. The DASH player may make a random and uniform selection among all the BaseURLs and then make all future requests using the selected BaseURL.

In yet another example, just one selection criteria appears in the selectionAttribute. In this example, the DASH player determines an appropriate one of CDNs 92 using simple selection criteria, e.g., by random selection to load balance the servers, by time of day, by least round trip delay, by least hopcount, and/or using location criteria. The DASH client then makes all future requests using the selected BaseURL. For example, a value of <selectionAttribute="1(0.2, 0.2, 0.3, 0.3)"> may cause the load balancing mechanism, executed by the client device, to randomly select among all possible BaseURLs. However, there is a 20% chance of picking the first two BaseURLs, and a 30% chance of picking the last two BaseURLs. Once a BaseURL is chosen, the DASH client would keep reusing the chosen BaseURL for future requests.

In still another example, more than one selectionAttribute may be specified. For example, there may be a value such as <selectionAttribute="3, 4, 2 (0-359, 359-1439, 0-1439, 1080-1439), 1(0.2, 0.2, 0.2, 0.4)">. In this example, the presence of extra selectionAttributes indicates that the DASH player should use criteria 3 first, then criteria 4, then use criteria 2, then break ties with criteria 1 according to the given weights, i.e., 0.2, 0.2, 0.2, and 0.4. Note that if some BaseURLs have already been eliminated, the remaining weights may be scaled up so their sum is 1.0.

To illustrate this example, suppose there are 4 potential BaseURLs, A, B, C, and D, where the BaseURLs correspond to respective CDNs. For example, A may correspond to CDN 92A, B may correspond to CDN 92B, C may correspond to CDN 92C, and D may correspond to CDN 92D. First, round trip delay (RTD) may be calculated for each of A, B, C, and D, e.g., using ping messages. This may indicate that the RTDs are as follows: A—20 ms; B—20 ms; C—33 ms; D—40 ms. Then, the choice list, in decreasing preference, is: A, B, C, D, where A and B are tied for first. Accordingly, the hopcount for each of A, B, C, and D may be measured, e.g., using the Internet control message protocol (ICMP) ping messages. That is, client device 40 may submit ICMP ping messages to respective ones of CDNs 92 to calculate the hopcount for each. For purposes of example, suppose that the following values for hopcounts are determined: A—5 hops; B—3 hops; C—12 hops; D—20 hops. Then, the choice list in decreasing preference is B, A, C, D, because B is determined to have fewer hops than A, making B more desirable.

Continuing with this example, the time of day may be determined as, e.g., 3:00 pm. The time of day values signaled for the BaseURLs may be as follows: A—6 pm to midnight; B—midnight to 6 am; C—6 am to midnight; D—all day. The client device may then eliminate A and B, assuming that the current time of day is 3:00 pm, because 3:00 pm falls outside of the time of day ranges for A and B, in this example. Thus, the final choice may come down to C or D (e.g., CDNs 92C or 92D). The minimum lexicographic choice may be made, which corresponds to C, because 33 ms<40 ms.

In yet another example, there may be a small number of CDNs but a large number of time-of-day constraints, load balancing weights, or similar restrictions on the CDNs. In this example, if there are N BaseURLs, the selectionAttribute may contain a few constraints, but each constraint may have more than N arguments. The $(N+1)^{st}$ argument may refer to URL #1, the $(N+2)^{nd}$ argument may refer to URL #2, and so on. In this manner, the BaseURLs may repeat when there are more than N arguments. This example may save storage space by making it unnecessary to repeat BaseURLs. In this case the number of arguments for each constraint should match. This is especially useful for constraints such as time of day.

To illustrate this example, with 4 CDNs A, B, C, D, there could be different load balancing constraints depending upon the time of day. In the morning, CDNs 92A and 92B may receive 80% of the load, evenly balanced, but in the evening, CDNs 92C and 92D get 70% of the load, evenly balanced. This constraint could be described as follows: <selectionAttribute="2(0-719, 0-719, 0-719, 0-719, 720-1439, 720-1439, 720-1440, 720-1439) 1(0.4, 0.4, 0.1, 0.1, 0.1, 0.2, 0.35, 0.35)">.

FIG. 4 is a conceptual diagram illustrating elements of an example multimedia content 100. Multimedia content 100 may correspond to multimedia content 64 (FIG. 1), or another multimedia content stored in memory 62. In the example of FIG. 4, multimedia content 100 includes media presentation description (MPD) 102 and a plurality of representations 110-120. Representation 110 includes optional header data 112 and segments 114A-114N (segments 114), while representation 120 includes optional header data 122 and segments 124A-124N (segments 124). The letter N is used to designate the last movie fragment in each of representations 110, 120 as a matter of convenience. In some examples, there may be different numbers of movie fragments between representations 110, 120.

MPD 102 may comprise a data structure separate from representations 110-120. MPD 102 may correspond to manifest file 66 of FIG. 1. Likewise, representations 110-120 may correspond to representations 68 of FIG. 1. In general, MPD 102 may include data that generally describes characteristics of representations 110-120, such as coding and rendering characteristics, adaptation sets, a profile to which MPD 102 corresponds, text type information, camera angle information, rating information, trick mode information (e.g., information indicative of representations that include temporal sub-sequences), and/or information for retrieving remote periods (e.g., for targeted advertisement insertion into media content during playback). Remote periods may also be referred to as external periods. FIGS. 4-7, discussed in greater detail below, illustrate various examples of multimedia content with various elements included in either or both of an MPD and/or representations (such as within segments of representations or header data of representations). Any or all of the MPDs of FIGS. 4-7 may correspond substantially to MPD 102 of FIG. 4.

In accordance with the techniques of this disclosure, MPD 102 of FIG. 4 may specify information such as, for example, a URL template for byte ranges, whether the template is required or optional, and CDN selection criteria. Example elements of an MPD Type specification in accordance with the techniques of this disclosure are provided in the XML pseudocode below.

```
<!-- MPD Type -->
  <xs:complexType name="MPDtype">
    <xs:sequence>
      <xs:element name="ProgramInformation"
        type="ProgramInformationType" minOccurs="0"/>
      <xs:element name="Period" type="PeriodType"
        maxOccurs="unbounded"/>
      <xs:element name="BaseURL" type="BaseURLType"
        minOccurs="0" maxOccurs="unbounded"/>
      <xs:any namespace="##other" processContents="lax"
        minOccurs="0" maxOccurs="unbounded"/>
    </xs:sequence>
```

```
    <xs:attribute name="redirectionUrl" type="xs:anyURI"/>
    <xs:attribute name="selectionAttribute" type="xs:string"/>
    <xs:attribute name="profiles" type="URIVectorType"/>
    <xs:attribute name="type" type="PresentationType"
        default="OnDemand"/>
    <xs:attribute name="availabilityStartTime" type="xs:dateTime"/>
    <xs:attribute name="availabilityEndTime" type="xs:dateTime"/>
    <xs:attribute name="mediaPresentationDuration"
        type="xs:duration"/>
    <xs:attribute name="minimumUpdatePeriodMPD"
        type="xs:duration"/>
    <xs:attribute name="minBufferTime" type="xs:duration"/>
    <xs:attribute name="timeShiftBufferDepth" type="xs:duration"/>
    <xs:anyAttribute namespace="##other" processContents="lax"/>
</xs:complexType>
```

In this manner, MPD 102 may include data indicative of a redirection URL for multimedia content 100. As described above with respect to FIG. 3, the BaseURL may be redirected to one of CDNs 92. That is, client device 40 may submit an HTTP POST to the redirection URL, which may correspond to redirection server device 94. Client device 40 may receive a response from redirection server device 94, such that the response includes information indicative of a new URL for receiving data from one of representations 110-120 of multimedia content 100, based on the BaseURL. In particular, the BaseURL may be used to select an appropriate one of CDNs 92.

Moreover, in accordance with the example pseudocode above, MPD 102 may include data indicative of a selection attribute. As discussed above, the selection attribute may include numeric data representative of selection criteria, which may or may not be accompanied by arguments for BaseURLs. Accordingly, client device 40 or a proxy device, such as proxy cache device 82 (FIG. 2), may use data of the selection attribute to select an appropriate one of CDNs 92 (FIG. 3) from which to cause client device 40 to retrieve data for multimedia content 100.

The following XML pseudocode provides an example set of elements for default segment access information, which may be provided in MPD 102.

```
<!-- Default Segment access information -->
<xs:complexType name="SegmentInfoDefaultType">
    <xs:sequence>
        <xs:element name="InitialisationSegmentURL" type="UrlType"
            minOccurs="0"/>
        <xs:element name="BaseURL" type="BaseURLType"
            minOccurs="0" maxOccurs="unbounded"/>
        <xs:element name="SegmentTimeline"
            type="SegmentTimelineType" minOccurs="0"/>
        <xs:any namespace="##other" processContents="lax"
            minOccurs="0" maxOccurs="unbounded"/>
    </xs:sequence>
    <xs:attributeGroup ref="SegmentInfoAttrGroup"/>
    <xs:attribute name="sourceURLTemplatePeriod" type="xs:string"/>
    <xs:attribute name="indexTemplate" type="xs:string"/>
    <xs:anyAttribute namespace="##other" processContents="lax"/>
</xs:complexType>
```

The XML pseudocode below provides an example set of elements for segment access information, which may be provided by MPD 102.

```
<!-- Segment access information -->
<xs:complexType name="SegmentInfoType">
    <xs:sequence>
        <xs:element name="InitialisationSegmentURL" type="UrlType"
            minOccurs="0"/>
        <xs:element name="BaseURL" type="BaseURLType"
            minOccurs="0" maxOccurs="unbounded"/>
        <xs:element name="SegmentTimeline"
            type="SegmentTimelineType" minOccurs="0"/>
        <xs:choice minOccurs="0">
            <xs:element name="UrlTemplate" type="UrlTemplateType"
                minOccurs="0"/>
            <xs:element name="ByteRangeTemplate"
                type="ByteRangeTemplateType" minOccurs="0"/>
            <xs:sequence>
                <xs:element name="Url" type="UrlType"
                    maxOccurs="unbounded"/>
                <xs:element name="Index" type="UrlType"
                    maxOccurs="unbounded"/>
                <xs:any namespace="##other" processContents="lax"
                    minOccurs="0" maxOccurs="unbounded"/>
            </xs:sequence>
            <xs:element name="SegmentList" type="SegmentListType"
                minOccurs="0"/>
            <xs:any namespace="##other" processContents="lax"
                minOccurs="0" maxOccurs="unbounded"/>
        </xs:choice>
    </xs:sequence>
    <xs:attributeGroup ref="SegmentInfoAttrGroup"/>
    <xs:anyAttribute namespace="##other" processContents="lax"/>
</xs:complexType>
```

In this manner, MPD 102 may include data representative of a URL template, which may specify how client devices, such as client device 40, may structure a URL in an HTTP GET request to request a byterange within the URL itself, rather than with a "Range:" header. Accordingly, client device 40 may use data of MPD 102 to construct an HTTP GET request that specifies a byte range within a URL, rather than using a "Range:" header. Therefore, although the request is constructed as an HTTP GET request, the request may cause a server device, such as server device 60, to provide only a requested byte range as specified by the URL itself. That is, rather than providing all data of the URL, server device 60 may instead provide the byte range requested within the URL itself. Thus, server device 60 need not evaluate data following a "Range:" header, but instead may determine a requested byte range from the URL itself. Likewise, proxy cache device 82 may be configured to analyze URLs of HTTP GET requests, and to cache and provide the requested byte range within the URL to client device 40, while also concatenating the requested byte range with previous and/or subsequent byte ranges of the same file.

The XML pseudocode below provides an example set of elements for grouping attributes that are common to SegmentInfo and SegmentInfoDefault, which may be provided by MPD 102. Examples of SegmentInfo and SegmentInfoDefault include:

```
<!-- grouping attributes common to SegmentInfo and
SegmentInfoDefault -->
<xs:attributeGroup name="SegmentInfoAttrGroup" >
    <xs:attribute name="duration" type="xs:duration"/>
    <xs:attribute name="startIndex" type="xs:unsignedInt" default="1"/>
</xs:attributeGroup>
```

The XML pseudocode below provides an example set of elements for a segment URL, which may be provided by MPD 102.

```
<!-- A Segment URL -->
<xs:complexType name="UrlType">
    <xs:sequence>
```

-continued

```
    <xs:any namespace="##other" processContents="lax"
        minOccurs="0" maxOccurs="unbounded"/>
    </xs:sequence>
    <xs:attribute name="sourceURL" type="xs:anyURI"/>
    <xs:attribute name="range" type="xs:string"/>
    <xs:anyAttribute namespace="##other" processContents="lax"/>
</xs:complexType>
```

The XML pseudocode below provides an example set of elements for a URL template, which may be provided by MPD 102.

```
<!-- A URL template -->
<xs:complexType name="UrlTemplateType">
    <xs:sequence>
        <xs:any namespace="##other" processContents="lax"
            minOccurs="0" maxOccurs="unbounded"/>
    </xs:sequence>
    <xs:attribute name="sourceURL" type="xs:anyURI"/>
    <xs:attribute name="indexURL" type="xs:anyURI"/>
    <xs:attribute name="endIndex" type="xs:unsignedInt"/>
    <xs:attribute name="byteRangeTemplate" type="xs:string" >
    <xs:attribute name="mustUseRangeURL" type="xs:unsignedInt">
    <xs:attribute name="allowedByteRanges" type="xs:unsignedInt">
    <xs:anyAttribute namespace="##other" processContents="lax"/>
</xs:complexType>
```

In this manner, MPD 102 may include information indicative of a URL template. That is, the element byteRangeTemplate represents data for a URL template for specifying a requested byte range. Moreover, in this manner, MPD 102 may include information indicating whether use of the template is required or optional. That is, data for mustUseRangeURL may indicate whether client device 40 is permitted to request a byte range using conventional HTTP partial GET requests or the template, or if client device 40 is required to use the template. Furthermore, data for allowedByteRanges may indicate particular byte ranges that can be requested, or whether there are no restrictions on byte ranges.

The XML pseudocode below provides an example set of elements for a segment list, which may be provided by MPD 102.

```
<!-- SegmentList allows xlink in addition to list of URLs -->
<xs:complexType name="SegmentListType">
    <xs:sequence>
        <xs:element name="Url" type="UrlType" minOccurs="0"
            maxOccurs="unbounded"/>
        <xs:element name="Index" type="UrlType" minOccurs="0"
            maxOccurs="unbounded"/>
    </xs:sequence>
    <xs:attribute ref="xlink:href"/>
    <xs:attribute ref="xlink:actuate" default="onRequest"/>
    <xs:attribute name="startIndex" type="xs:unsignedInt"/>
</xs:complexType>
```

Header data 112, when present, may describe characteristics of segments 114, e.g., temporal locations of random access points, which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 102.

Segments 114 include one or more coded video samples, each of which may include frames or slices of video data. Each of the coded video samples of segments 114 may have similar characteristics, e.g., height, width, and bandwidth requirements. Such characteristics may be described by data of MPD 102, though such data is not illustrated in the example of FIG. 4. MPD 102 may include characteristics as described by the 3GPP Specification, with the addition of any or all of the signaled information described in this disclosure.

Each of segments 114, 124 may be associated with a unique uniform resource identifier (URI), e.g., a uniform resource locator (URL). Thus, each of segments 114, 124 may be independently retrievable using a streaming network protocol, such as DASH. In this manner, a destination device, such as client device 40, may use an HTTP Get request to retrieve segments 114 or 124. In some examples, client device 40 may use HTTP partial GET requests to retrieve specific byte ranges of segments 114 or 124.

As noted above, MPD 102 may conform to a particular MPD profile. MPD 102 may include information indicative of a Multipurpose Internet Mail Extension (MIME) type for MPD 102 and/or multimedia content 100. MIME types generally do not indicate what codec is needed to present multimedia content, however. In general, it is assumed that if a device can retrieve an MPD for multimedia content, such as MPD 102, that the device can playback data of the multimedia content corresponding to the MPD. However, this assumption may not always be safe. Therefore, in some examples, MPD 102 may include information indicative of a profile to which MPD 102 corresponds.

There may be a relatively small number of profiles to which MPDs may correspond. Profiles may be supported by levels to address capabilities, similar to the manner in which H.264/AVC includes profiles and levels for video coding. MPD profiles may be onion-shelled, in that a higher profile may include all features of all lower profiles. There may be a registration process with a registration authority to register various profiles. In some examples, a client device, such as client device 40, may be configured to retrieve information indicative of the profile for the MPD, such as MPD 102, before retrieving other data of the MPD, such as characteristics of representations 110-120 signaled by MPD 102. In this manner, the profile for MPD 102 may be signaled before access to MPD 102 is provided.

A profile identifier may be provided in plain text (e.g., as a plain name), or a reversed domain name. Plain names may be reserved by a registration authority, such as 3GPP or another registration authority. A profile may be considered a claim and a permission, in that the profile may claim that a corresponding multimedia content conforms to the profile and gives permission to a reader (e.g., a client device) that implements that profile to read the MPD, interpret what it recognizes, and ignore material that it does not understand.

Profiles may describe characteristics such as, for example, features of MPD 102, usage of the network, media format(s), codec(s) used, protection formats, and/or quantitative measures such as bitrates, screen sizes, and the like. In this manner, the profile of MPD 102 may provide information indicative of what codecs need to be supported in order to retrieve data of MPD 102 and/or multimedia content 100. Profiles may also be described as "conformance points." Profiles with which an MPD complies may be indicated in a "Profiles" attribute of the MPD. Thus, a client device may be configured to retrieve a portion of MPD 102 including information relating to the "Profiles" attribute before retrieving additional data of MPD 102. Alternatively, profiles may be indicated as a parameter in the MIME type of the MPD. For example, profiles "X, Y, and Z" may be signaled by, e.g., content preparation device 20, in the following fashion:

video/vnd.mpeg.mpd;profiles="X,Y,Z."

Figure 5:
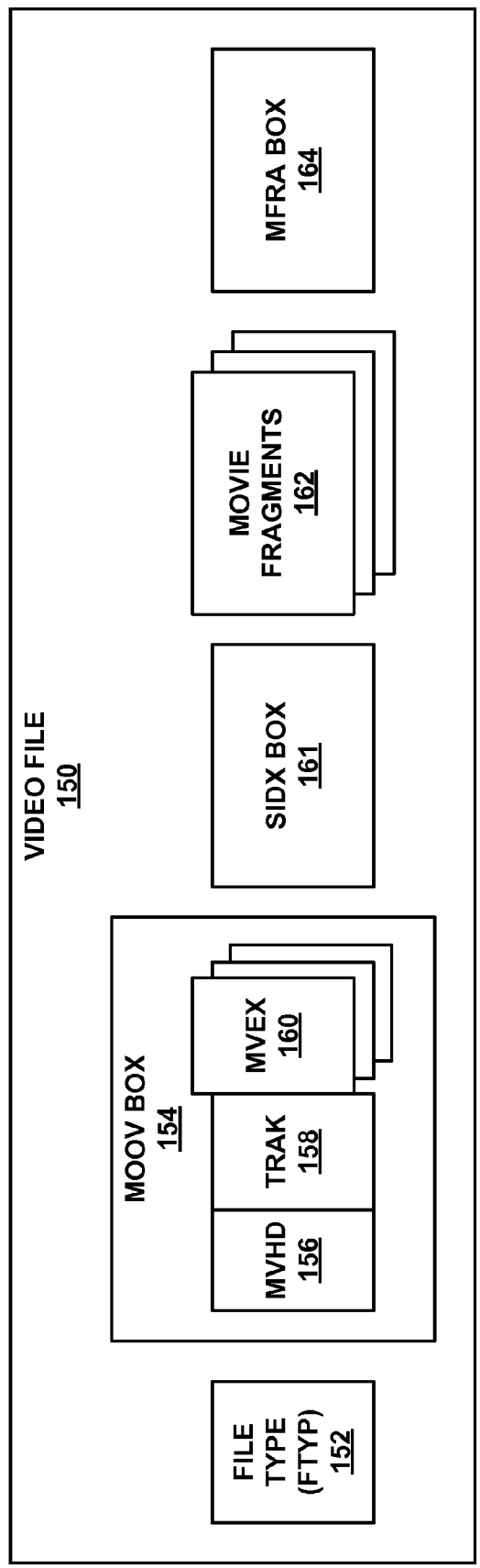
FIG. 5 is a block diagram illustrating elements of an example video file, which may correspond to a segment of a representation of multimedia content.

FIG. 5 is a block diagram illustrating elements of an example video file 150, which may correspond to a segment of a representation, such as one of segments 114, 124 of FIG. 4. Each of segments 114, 124 may include data that conforms substantially to the arrangement of data illustrated in the example of FIG. 5. As described above, video files in accordance with the ISO base media file format and extensions thereof store data in a series of objects, referred to as "boxes." In the example of FIG. 5, video file 150 includes file type (FTYP) box 152, movie (MOOV) box 154, movie fragments 162 (also referred to as movie fragment boxes (MOOF)), and movie fragment random access (MFRA) box 164.

Video file 150 generally represents an example of a segment of multimedia content, which may be included in one of representations 110-120 (FIG. 4). In this manner, video file 150 may correspond to one of segments 114, one of segments 124, or a segment of another representation. In accordance with the techniques of this disclosure, a client device, such as client device 40, may request to retrieve a subset of movie fragments 162 using a URL that specifies a byte range. The byte range may correspond to a sub-sequence of movie fragments 162. Likewise, a proxy cache device, such as proxy cache device 82, may retrieve all of the data of video file 150 in response to a request to retrieve a particular byte range. In other examples, proxy cache device 82 may assemble video file 150 following a set of requests for byte ranges of video file 150, assuming that the set of requests corresponds to the full amount of data for video file 150.

In the example of FIG. 5, video file 150 includes one segment index (SIDX) box 161. In some examples, video file 150 may include additional SIDX boxes, e.g., between movie fragments 162. In general, SIDX boxes, such as SIDX box 161, include information that describes byte ranges for one or more of movie fragments 162. In other examples, SIDX box 161 and/or other SIDX boxes may be provided within MOOV box 154, following MOOV box 154, preceding or following MFRA box 164, or elsewhere within video file 150.

File type (FTYP) box 152 generally describes a file type for video file 150. File type box 152 may include data that identifies a specification that describes a best use for video file 150. File type box 152 may be placed before MOOV box 154, movie fragment boxes 162, and MFRA box 164.

MOOV box 154, in the example of FIG. 5, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 162, which may be referenced by data of TRAK box 158.

In some examples, video file 150 may include more than one track, although this is not necessary for the DASH protocol to work. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 162, e.g., to signal that video file 150 includes movie fragments 162, in addition to video data included within MOOV box 154, if any. In the context of streaming video data, coded video pictures may be included in movie fragments 162 rather than in MOOV box 154. Accordingly, all coded video samples may be included in movie fragments 162, rather than in MOOV box 154.

MOOV box 154 may include a number of MVEX boxes 160 equal to the number of movie fragments 162 in video file 150. Each of MVEX boxes 160 may describe characteristics of a corresponding one of movie fragments 162. For example, each MVEX box may include a movie extends header box (MEHD) box that describes a temporal duration for the corresponding one of movie fragments 162.

As noted above, encapsulation unit 30 may store a sequence data set in a video sample that does not include actual coded video data. A video sample may generally correspond to an access unit, which is a representation of a coded picture at a specific time instance. In the context of AVC, the coded picture includes one or more VCL NAL units which contain the information to construct all the pixels of the access unit and other associated non-VCL NAL units, such as SEI messages. Accordingly, encapsulation unit 30 may include a sequence data set, which may include sequence level SEI messages, in one of movie fragments 162. Encapsulation unit 30 may further signal the presence of a sequence data set and/or sequence level SEI messages as being present in one of movie fragments 162 within the one of MVEX boxes 160 corresponding to the one of movie fragments 162.

Movie fragments 162 may include one or more coded video pictures. In some examples, movie fragments 162 may include one or more groups of pictures (GOPs), each of which may include a number of coded video pictures, e.g., frames or pictures. In addition, as described above, movie fragments 162 may include sequence data sets in some examples. Each of the movie fragments 162 may include a movie fragment header box (MFHD, not shown in FIG. 5). The MFHD box may describe characteristics of the corresponding movie fragment, such as a sequence number for the movie fragment. Movie fragments 162 may be included in order of sequence number in video file 150.

MFRA box 164 may describe random access points within movie fragments 162 of video file 150. This may assist with performing trick modes, such as performing seeks to particular temporal locations within video file 150. MFRA box 164 is generally optional and need not be included in video files, in some examples. Likewise, a client device, such as client device 40, does not necessarily need to reference MFRA box 164 to correctly decode and display video data of video file 150. MFRA box 164 may include a number of track fragment random access (TFRA) boxes (not shown) equal to the number of tracks of video file 150, or in some examples, equal to the number of media tracks (e.g., non-hint tracks) of video file 150.

Figure 6:
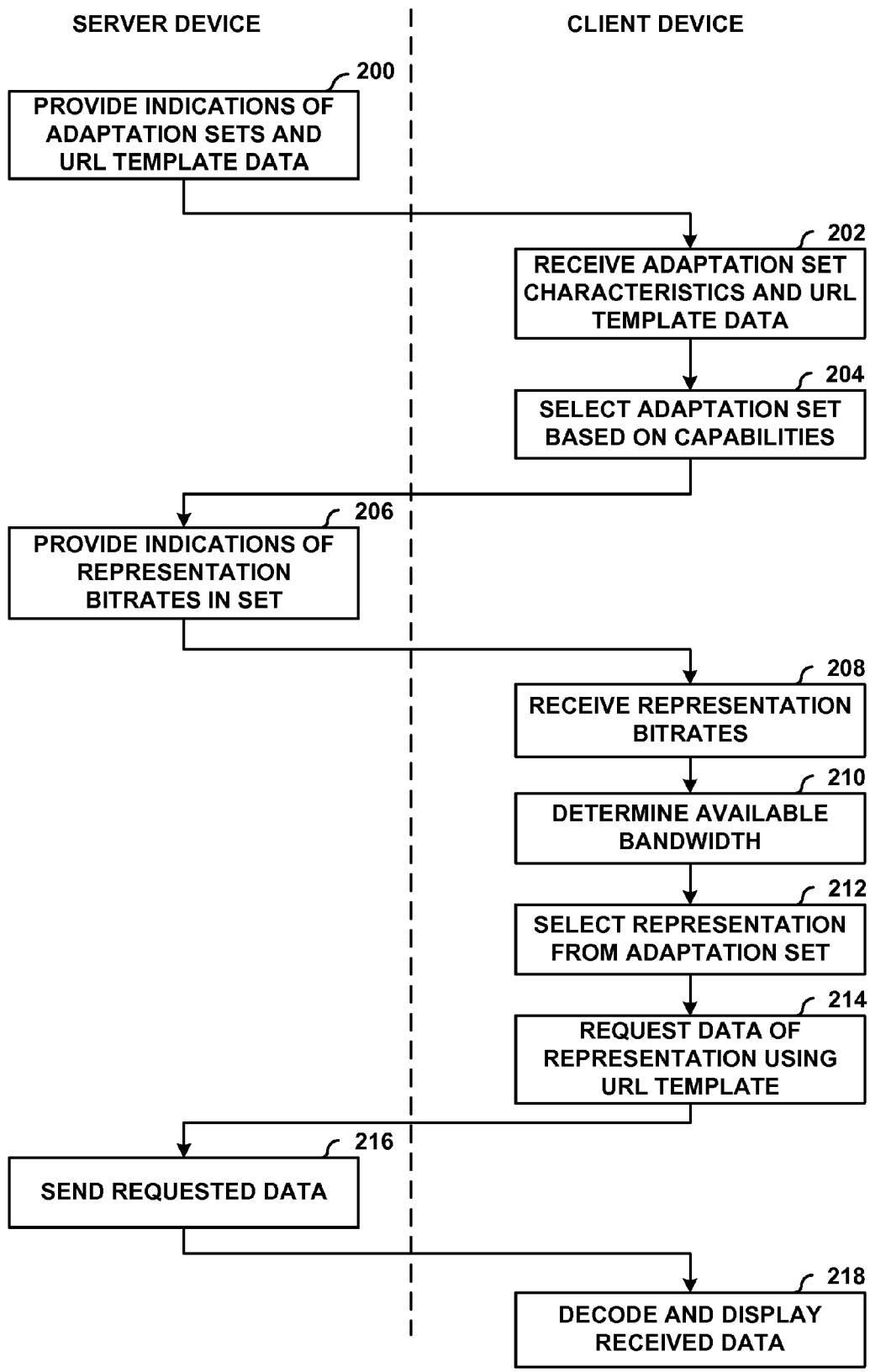
FIG. 6 is a flowchart illustrating an example method for providing indications of URL template data, and for generating byte range requests using the URL template data by a client device.

FIG. 6 is a flowchart illustrating an example method for providing indications of URL template data, and for generating byte range requests using the URL template data by a client device. Although the method of FIG. 6 is described with respect to server device 60 and client device 40, it should be understood that other devices may implement techniques similar to those of the method of FIG. 6. For example, content preparation device 20 or one or more network devices of a content distribution network, such as proxy cache device 82 or routing devices 80, may perform some or all of the functions attributed to server device 60.

Although not shown in FIG. 6, in some examples, client device 40 may initially determine a CDN from which to request multimedia content. In some examples, client device 40 may select the CDN from a plurality of CDNs, while in other examples, a redirection server, such as redirection server device 94, may select a CDN and provide information to client device 40 indicative of the selected CDN. Accordingly, client device 40 may select a CDN or receive an indication of a CDN to determine a CDN from which to request data of multimedia content. One example process for selecting a CDN is explained in greater detail below with respect to FIG. 9.

Server device 60 may provide indications of adaptation sets and URL template data to client device 40 (200). For example, server device 60 may provide MPD 102 (FIG. 4) to client device 40. As discussed above, MPD 102 may include information representative of a URL template, as well as whether the template is required or optional for byte range requests. Client device 40 may receive information describing adaptation set characteristics (202), e.g., from the MPD file received from server device 60. Likewise, client device 40 may receive information describing a URL template and whether use of the template is required or optional for requesting byte ranges, e.g., from the received MPD file.

Client device 40 may then analyze the adaptation set characteristics to eliminate adaptation sets that client device 40 cannot or would not elect to retrieve, decode, or render. For example, client device 40 may compare decoding and rendering capabilities to characteristics of the adaptation sets to determine inappropriate adaptation sets. As another example, client device 40 may compare user preferences for language, rating, and amount of depth (e.g., as provided by two or more views having particular camera angles for three-dimensional video playback), to eliminate undesirable adaptation sets. Client device 40 may then select an appropriate adaptation set based at least in part on the decoding and rendering capabilities of client device 40 (204).

After selecting an adaptation set, client device 40 may request data for an MPD portion that specifically describes representations of the adaptation set. In response, server device 60 may provide indications of representation bitrates, among other individual representation characteristics, in the selected adaptation set to client device 40 (206). For example, server device 60 may send data for a specific one of MPD portions for adaptation sets 260 (FIG. 6) to client device 40. In other examples, client device 40 may have already received a full MPD for the multimedia content (e.g., MPD 202 of FIG. 5), but may particularly analyze portions of the MPD corresponding specifically to the selected adaptation set. In this manner, in some examples, step 206 of FIG. 6 may occur prior to step 202 and/or step 204.

In any case, after receiving characteristics specific to representations of the selected adaptation set including bitrates for the representations (208), client device 40 may determine a currently available amount of network bandwidth (210). Client device 40 may then select a representation from the selected adaptation set (212), such that the selected representation has a bitrate that can be accommodated by the determined currently available amount of network bandwidth. The bitrates of the representations represent examples of coding characteristics of the individual representations in the adaptation set. Client device 40 may then request data of the selected representation using the URL template (214).

For example, client device 40 may construct an HTTP GET request to request a segment of the selected representation, where a URL in the HTTP GET request specifies a byte range of data to be requested. Alternatively, client device 40 may construct an HTTP partial GET that specifies a byte range of a segment of the selected representation, assuming that partial GET requests are permitted (that is, that use of the URL template is optional). In some examples, the URL template data may further specify particular byte ranges that are permissible. In such cases, client device 40 may select one of the available byte ranges. In any case, client device 40 may submit the request to server device 60. As noted above, in other examples, client device 40 may submit the request to a BaseURL, which may cause the request to be received by a proxy device or cache device, which may service the request instead of a server device.

In the example of FIG. 6, server device 60 may receive the request, and in response, send the requested data to client device 40 (216). For example, request processing unit 70 may determine a network address of client device 40 from data of the received request, e.g., a source Internet protocol (IP) address and source port of the received request. Request processing unit 70 may form network packets including the requested data and send the requested data to client device 40, e.g., destined for the determined IP address of client device 40.

After receiving the requested data, client device 40 may begin decoding and displaying the received data (218). While receiving requested data, client device 40 may continue analyzing currently available network bandwidth and submitting requests from representations having bitrates that can be accommodated by the currently available amount of network bandwidth (210-214). If the amount of network bandwidth changes, client device 40 may adaptively switch to a different representation in the selected adaptation set. For example, client device 40 may determine a segment in a new representation corresponding to the temporal location of the last segment requested from a previous representation in the adaptation set, then request the determined segment (or a portion thereof) in the new representation.

In this manner, FIG. 6 represents an example of a method of retrieving multimedia data that includes determining a byte range of a file of a representation of multimedia content to request from a source device, forming a uniform resource locator (URL) that specifies, in a file path portion of the URL, the file and the byte range in accordance with requirements of the source device, and issuing a GET request that specifies the formed URL to the source device.

FIG. 6 also represents an example of a method of sending information for video data, which includes providing a manifest file for multimedia content, wherein the manifest file specifies a uniform resource locator (URL) template and a byte range template, wherein the URL template and the byte range template provide a template for forming a URL to include a byte range request within the URL, receiving a request including a URL constructed according to the URL template and the byte range template, wherein the URL of the request specifies a byte range of a representation of the multimedia content, and, in response to the request, outputting multimedia data of the representation corresponding to the byte range of the request.

Figure 7:
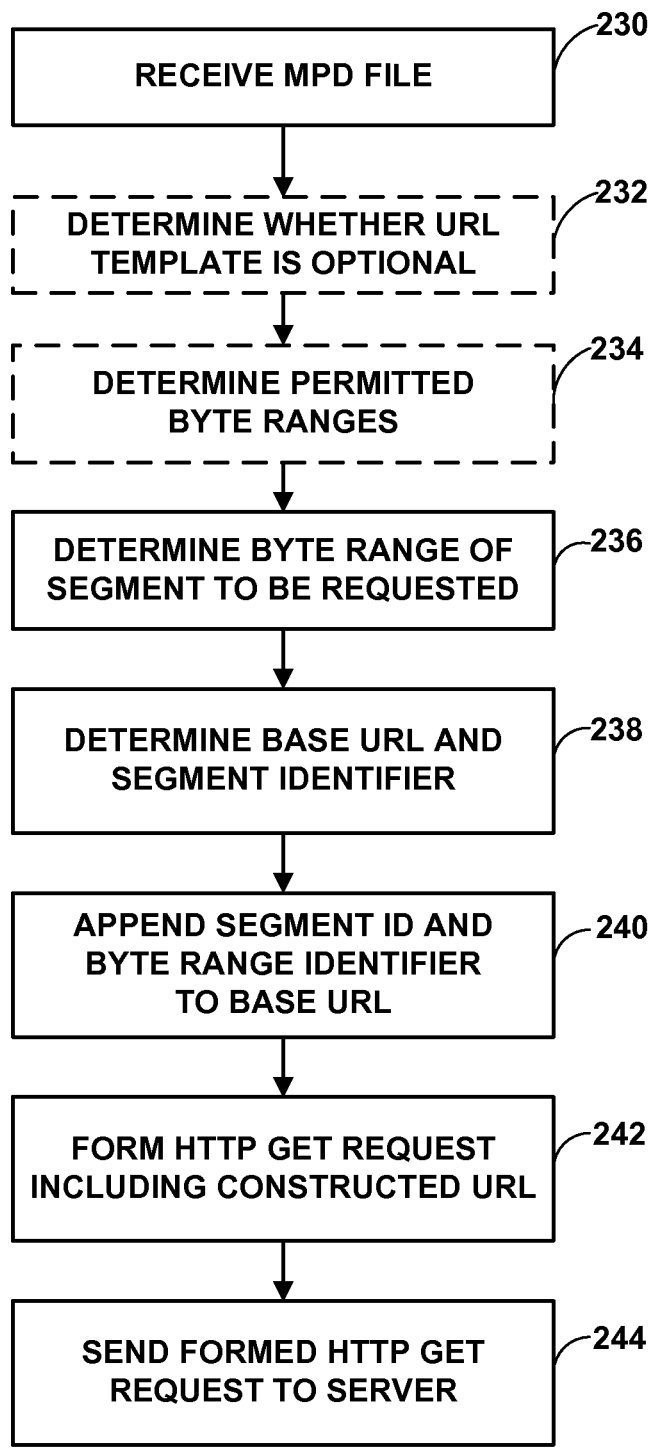
FIG. 7 is a flowchart illustrating an example method for generating a GET request that specifies a byte range in a URL.

FIG. 7 is a flowchart illustrating an example method for generating a GET request that specifies a byte range in a URL. The method of FIG. 7 may be performed by a client device, such as client device 40. Boxes with dashed lines represent optional steps. A similar method may be performed by an intermediate network device, such as proxy cache device 82. Some slight modifications to the method may be made when performed by an intermediate network device, as discussed below. For purposes of example, the method of FIG. 7 is described with respect to client device 40. In some examples, steps 230-234 may be performed substantially contemporaneously with steps 202 and 204 of FIG. 6, and steps 236-244 may correspond to step 214 of FIG. 6. The steps of FIGS. 6 and 7 need not necessarily be performed in the order shown, and additional steps may be performed or certain steps may be omitted or performed in parallel rather than sequentially.

Initially, client device 40 may receive information corresponding to an MPD file for multimedia content (230). The MPD file may include information specifying a URL template for embedding a byte range in a URL of an HTTP GET request. For example, the URL template may specify the following, for both the URL and a byte range template:

URLTemplate="http://www.mp4player.com/TRON/segment.$Bandwidth$.$Index$:"

ByteRangeTemplate="$Url$/$StartByte$/$EndByte$"

The MPD file may further include information indicating whether the URL template is required or optional. Accordingly, client device 40 may, in some examples, determine whether the URL template is required or optional (232), based on an analysis of the data of the MPD file. Likewise, in some examples, the MPD file may provide an indication of permitted byte ranges that can be requested, or may indicate that byte ranges are not restricted. Thus, client device 40 may use the MPD file to determine permitted byte ranges, in some examples (234).

Client device 40 may then determine a byte range of a segment to be requested (236). For example, if client device 40 has just begun streaming data of the selected multimedia content, client device 40 may determine to request an ordinal first byte range of the segment. As another example, if client device 40 has previously requested an $N^{th}$ byte range of the segment, client device 40 may determine to request the $N+1^{st}$ byte range of the segment. Client device 40 may also determine a base URL for a selected representation, as well as a segment identifier (238). For example, as discussed above, the base URL may correspond to "http://www.mp4player.com/TRON/" and the segment identifier may comprise a numeric, alphabetic, alphanumeric, or other value representative of a current segment. The segment identifier may identify the segment, as well as a selected representation in which the segment is included. For example, the segment identifier may include values that specify the bandwidth and/or index of the selected representation, as well as a value that specifies the segment of the selected representation.

Thus, together, the base URL and the segment identifier may form a first portion of the URL that client device 40 will ultimately include in an HTTP GET request to retrieve the next byte range. Client device 40 may append the segment ID, as well as an identifier of the byte range to be requested, to the base URL (240), forming a URL to be included in an HTTP GET request. For example, assuming that the segment is identified using "segment.1000.27," and assuming that the byte range to be requested is bytes 435291 to 560829, client device 40 may append "segment.1000.27/435291/560829" to the base URL, forming the following URL in this example: "http://www.mp4player.com/TRON/segment.1000.27/435291/560829." This URL corresponds to a file path portion of a URL. Another portion of the URL may specify a protocol, e.g., "HTTP/1.1," or other data for retrieving the file at the corresponding file path.

Client device 40 may then form an HTTP GET request including the constructed URL (242). For example, client device 40 may specify that the request is a GET request by prepending the command "GET" before the URL and appending "HTTP/1.1" after the URL, as well as specifying the host of the multimedia content, e.g., "www.mp4player.com." In some examples, client device 40 may form the request to include an indication that a byte range is contained in the URL, e.g., by using the extension header "X-Dash-Byte-Range-URL" of this disclosure. Thus, the constructed GET request with a URL that specifies a byte range may correspond to:

GET http://www.mp4player.com/TRON/segment.1000.27/435291/560829 HTTP/1.1

Host: www.mp4player.com

Client device 40 may then send the formed HTTP GET request to the server (244), e.g., www.mp4player.com. As mentioned above, an intermediate network device may perform a method similar to that of FIG. 7 to form an HTTP GET request including a URL that specifies a byte range in a file path portion. In general, the intermediate network device may receive the MPD file to determine a URL template for the multimedia content from the server device, and may receive a conventional HTTP partial GET request from a client device. The intermediate network device may then use the URL template (including the byte range template) to form an HTTP GET request from the partial GET request, such that the HTTP GET request includes a URL that specifies the byte range indicated by the partial GET request.

In this manner, the method of FIG. 7 represents an example of a method for retrieving multimedia data. The example method of FIG. 7 includes determining a byte range of a file of a representation of multimedia content to request from a source device, forming a uniform resource locator (URL) that specifies, in a file path portion of the URL, the file and the byte range in accordance with requirements of the source device, and issuing a GET request that specifies the formed URL to the source device.

Figure 8:
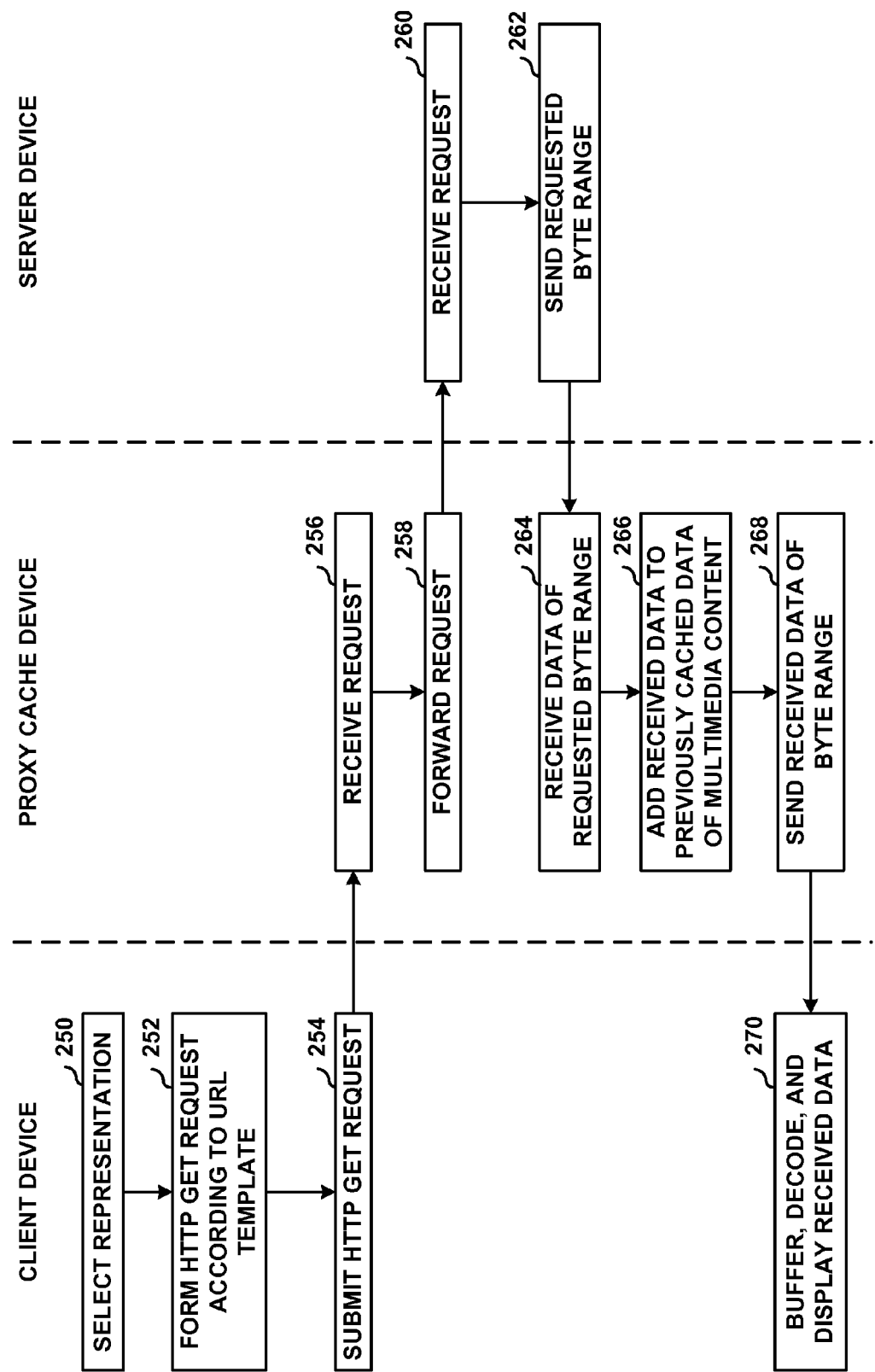
FIG. 8 is a flowchart illustrating an example method in which an HTTP GET request is exchanged between a client device and a server device via an intermediate network device.

FIG. 8 is a flowchart illustrating an example method in which an HTTP GET request is exchanged between a client device and a server device via an intermediate network device. This example method is described with respect to client device 40, proxy cache device 82, and server device 60, although it should be understood that other devices may be configured to perform a similar method.

In the example of FIG. 8, client device 40 selects a representation of multimedia content (250). Then, client device 40 forms an HTTP GET request according to a URL template (252), such that the HTTP GET request specifies a byte range in a URL of the request. The URL template may include data for a byte range template of the URL. In some examples, client device 40 may form the request to include an indication that a byte range is contained in the URL, e.g., by using the extension header "X-Dash-Byte-Range-URL" of this disclosure. After forming the request, client device 40 may submit the HTTP GET request to server device 60 (254).

Proxy cache device 82 lies along a network route between client device 40 and server device 60 in this example, e.g., as shown in FIG. 2. Accordingly, proxy cache device 82 may receive the request issued by client device 40 (256). Proxy cache device 82 may determine that the request is a request for a byte range by analyzing the URL of the request, and forward the request to server device 60 (258). Alternatively, proxy cache device 82 may determine that the request is a request for a byte range upon detecting the extension header "X-Dash-Byte-Range-URL." Server device 60 may ultimately receive the request (260) and send the requested byte range (262).

That is, server device 60 provides data corresponding to the requested byte range from the respective segment of the representation of multimedia content to client device 40.

Again, proxy cache device 82 may receive the data of the requested byte range (264), due to the location of proxy cache device 82 along the route between client device 40 and server device 60. Proxy cache device 82 may then add the received data to any previously cached data of the corresponding multimedia content (266). If no data had yet been received, proxy cache device 82 could form a new, locally cached set of data for the multimedia content. Proxy cache device 82 may also concatenate subsequently received data for the multimedia content with the currently cached data for the multimedia content. Proxy cache device 82 may also send the received data of the byte range to client device 40 (268). Client device 40 may, in turn, buffer, decode, and display the received data (270).

As noted with respect to FIG. 7, in some examples, an intermediate network device may be configured to convert a partial GET request into an HTTP GET request including an URL that specifies a byte range. To do so, client device 40 would create a partial GET request in place of the HTTP GET request of step 252. Then, proxy cache device 82 may convert the partial GET request between steps 256 and 258, e.g., according to a URL Template and a byte range template. Alternatively, proxy cache device 82 may convert a detected "Range:" header to the new extension header "X-Dash-ByteRange-URL," in accordance with the techniques of this disclosure, which may be followed by the originally specified byte range of the partial GET request.

Figure 9:
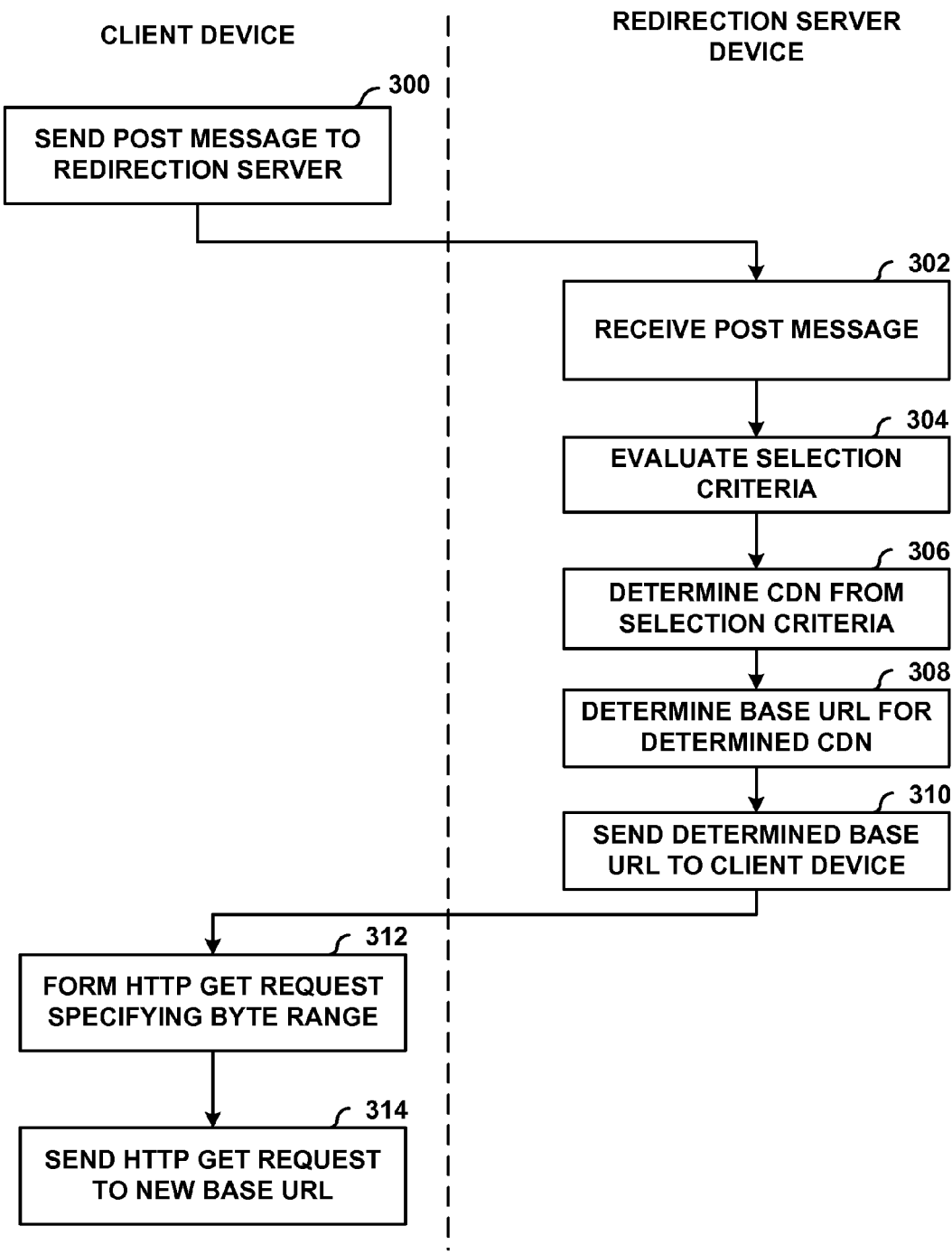
FIG. 9 is a flowchart illustrating an example method for determining a CDN from which to retrieve data of multimedia content.

FIG. 9 is a flowchart illustrating an example method for determining a CDN from which to retrieve data of multimedia content. FIG. 9 represents merely one example method. As described above, other methods for selecting a CDN are also possible, e.g., without the use of a redirection server device. For instance, client device 40 may be configured to receive and evaluate selection criteria in lieu of a redirection server device. For purposes of example, the method of FIG. 9 is described with respect to client device 40 and redirection server device 94.

In this example, assuming that client device 40 has already received an MPD file, client device 40 sends a POST message to redirection server device 94 (300). An MPD file for the multimedia content may specify an address for redirection server device 94 at a redirection URL. Accordingly, client device 40 may send the POST message to the redirection URL, causing the POST message to ultimately arrive at redirection server device 94.

Redirection server device 94 may receive the post message (302). In response, redirection server device 94 may evaluate selection criteria for selecting a CDN (304). The selection criteria may include any or all of weighted random criteria, time of day, round trip delay between client device 40 and the CDNs, hopcounts between client device 40 and the CDNs, locations of client device 40 and the CDNs, or other criteria. By evaluating the selection criteria, redirection server device 94 may determine a CDN from the selection criteria (306). Moreover, redirection server device 94 may be configured with data representative of base URLs for the multimedia content at each of the CDNs. Accordingly, redirection server device 94 may determine the base ULR for the determined CDN (308).

Redirection server device 94 may then send the determined base URL to client device 40 (310). Accordingly, client device 40 may form an HTTP GET request that specifies a particular byte range (312), which may specify the received base URL. Moreover, client device 40 may send the HTTP GET request to the new base URL (314), causing the HTTP GET request to be directed to the determined CDN. That is, client device 40 may perform a domain name service (DNS) lookup on the base URL to determine an IP address of a device of the CDN to which to issue the GET request, and may then send the GET request to the determined IP address. Afterwards, the CDN may respond to the GET request with the selected byte range, and client device 40 may continue submitting a series of byte range requests to the same CDN.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving multimedia data, the method comprising:
    determining a byte range of a file of a representation of multimedia content to request from a source device;
    forming a uniform resource locator (URL) that specifies, in a file path portion of the URL, according to a template, the file and the byte range in accordance with requirements of the source device; and
    issuing a GET request that specifies the formed URL to the source device, wherein the GET request does not include a "Range:" header.

2. The method of claim 1, further comprising receiving a manifest file for the multimedia content, wherein the manifest file specifies a plurality of byte ranges that can be requested for the representation, wherein determining the byte range comprises selecting the byte range of the representation from the plurality of byte ranges.

3. The method of claim 1, further comprising receiving data of the representation comprising a segment index data structure, wherein the segment index data structure specifies a plurality of byte ranges that can be requested for the representation, and wherein determining the byte range comprises selecting the byte range of the representation from the plurality of byte ranges.

4. The method of claim 1, further comprising forming the GET request to include an extension header that indicates a location of the byte range in the URL of the GET request.

5. The method of claim 1, further comprising:
    receiving one or more selection criteria for selecting one of a plurality of content distribution networks (CDNs); and
    selecting a CDN from the plurality of CDNs based on the selection criteria,
    wherein issuing the GET request comprises issuing the GET request to the selected CDN, and
    wherein forming the URL according to the template comprises forming the URL according to a byte range template specific to the selected CDN.

6. The method of claim 1, further comprising:
    submitting a POST message to a redirection URL to determine one of a plurality of content distribution networks (CDNs) from which to retrieve the data; and
    receiving, in response to the POST message, an indication of a base URL for one of the plurality of CDNs,
    wherein forming the URL comprises forming the URL to specify the received base URL for the one of the plurality of CDNs,
    wherein forming the URL according to the template comprises forming the URL according to a byte range template specific to the selected CDN, and
    wherein issuing the GET request comprises issuing the GET request to the one of the plurality of CDNs.

7. The method of claim 6, wherein submitting the POST message comprises submitting one or more POST messages indicating one or more of a BaseURL, selection criteria, and local information including one or more of geolocation information, hop counts, and local time of day to the redirection URL.

8. The method of claim 1, further comprising receiving information indicative of the template from the source device.

9. The method of claim 1, wherein determining comprises determining by a client device, wherein forming comprises forming by the client device, and wherein issuing comprises issuing by the client device.

10. A device for receiving information for multimedia data, the device comprising one or more processors configured to determine a byte range of a file of a representation of multimedia content to request from a source device, form a uniform resource locator (URL) that specifies, in a file path portion of the URL, according to a template, the file and the byte range in accordance with requirements of the source device, and issue a GET request that specifies the formed URL to the source device, wherein the GET request does not include a "Range:" header.

11. The device of claim 10, wherein the one or more processors are further configured to receive a manifest file for the multimedia content, wherein the manifest file specifies a plurality of byte ranges that can be requested for the representation, and wherein to determine the byte range, the one or more processors are configured to select the byte range of the representation from the plurality of byte ranges.

12. The device of claim 10, wherein the one or more processors are further configured to receive data of the representation comprising a segment index data structure, wherein the segment index data structure specifies a plurality of byte ranges that can be requested for the representation, and wherein to determine the byte range, the one or more processors are configured to select the byte range of the representation from the plurality of byte ranges.

13. The device of claim 10, wherein the one or more processors are further configured to form the GET request to include an extension header that indicates a location of the byte range in the URL of the GET request.

14. The device of claim 10, wherein the one or more processors are further configured to receive one or more selection criteria for selecting one of a plurality of content distribution networks (CDN), select a CDN from the plurality of CDNs based on the selection criteria, and issue the GET request to the selected CDN, wherein the template comprises a byte-range template that is specific to the selected CDN.

15. The device of claim 10, wherein the device comprises at least one of: an integrated circuit; a microprocessor; and a wireless communication device that includes the one or more processors.

16. A device for retrieving multimedia data, the device comprising:
    means for determining a byte range of a file of a representation of multimedia content to request from a source device;
    means for forming a uniform resource locator (URL) that specifies, in a file path portion of the URL, according to a template, the file and the byte range in accordance with requirements of the source device; and
    means for issuing a GET request that specifies the formed URL to the source device, wherein the GET request does not include a "Range:" header.

17. The device of claim 16, further comprising means for receiving a manifest file for the multimedia content, wherein the manifest file specifies a plurality of byte ranges that can be requested for the representation, wherein the means for determining the byte range comprises means for selecting the byte range of the representation from the plurality of byte ranges.

18. The device of claim 16, further comprising means for receiving data of the representation comprising a segment index data structure, wherein the segment index data structure specifies a plurality of byte ranges that can be requested for the representation, and wherein the means for determining the byte range comprises means for selecting the byte range of the representation from the plurality of byte ranges.

19. The device of claim 16, further comprising means for forming the GET request to include an extension header that indicates a location of the byte range in the URL of the GET request.

20. The device of claim 16, further comprising:
means for receiving one or more selection criteria for selecting one of a plurality of content distribution networks (CDN); and
means for selecting a CDN from the plurality of CDNs based on the selection criteria,
wherein the means for issuing the GET request comprises means for issuing the GET request to the selected CDN, and
wherein the means for forming the URL according to the template comprises means for forming the URL according to a byte range template specific to the selected CDN.

21. A computer program product comprising a non-transitory computer-readable medium having stored thereon instructions that, when executed, cause one or more processors of a device for retrieving multimedia data to:
determine a byte range of a file of a representation of multimedia content to request from a source device;
form a uniform resource locator (URL) that specifies, in a file path portion of the URL, according to a template, the file and the byte range in accordance with requirements of the source device; and
issue a GET request that specifies the formed URL to the source device, wherein the GET request does not include a "Range:" header.

22. The computer program product of claim 21, further comprising instructions that cause the processor to receive a manifest file for the multimedia content, wherein the manifest file specifies a plurality of byte ranges that can be requested for the representation, wherein the instructions that cause the processor to determine the byte range comprise instructions that cause the processor to select the byte range of the representation from the plurality of byte ranges.

23. The computer program product of claim 21, further comprising instructions that cause the processor to receive data of the representation comprising a segment index data structure, wherein the segment index data structure specifies a plurality of byte ranges that can be requested for the representation, and wherein the instructions that cause the processor to determine the byte range comprise instructions that cause the processor to select the byte range of the representation from the plurality of byte ranges.

24. The computer program product of claim 21, further comprising instructions that cause the processor to form the GET request to include an extension header that indicates a location of the byte range in the URL of the GET request.

25. The computer program product of claim 21, further comprising instructions that cause the processor to:
receive one or more selection criteria for selecting one of a plurality of content distribution networks (CDN); and
select a CDN from the plurality of CDNs based on the selection criteria,
wherein the instructions that cause the processor to issue the GET request comprise instructions that cause the processor to issue the GET request to the selected CDN, and
wherein the instructions that cause the processor to form the URL according to the template comprise instructions that cause the processor to form the URL according to a byte range template specific to the selected CDN.

26. A method of sending information for multimedia data, the method comprising:
providing a manifest file for multimedia content, wherein the manifest file specifies a uniform resource locator (URL) template and a byte range template, wherein the URL template and the byte range template provide a template for forming a URL to include a byte range request within the URL;
receiving a GET request including a URL constructed according to the URL template and the byte range template, wherein the URL of the request specifies a byte range of a representation of the multimedia content, wherein the GET request does not include a "Range:" header; and
in response to the request, outputting multimedia data of the representation corresponding to the byte range of the request.

27. The method of claim 26, wherein the manifest file further comprises information that specifies a plurality of byte ranges that can be requested for the representation, and wherein the byte range specified by the URL of the request comprises one of the plurality of byte ranges.

28. The method of claim 26, further comprising providing a segment index data structure that specifies a plurality of byte ranges that can be requested for the representation, and wherein the byte range specified by the URL of the request comprises one of the plurality of byte ranges.

29. The method of claim 26, further comprising receiving an extension header within the request, wherein the extension header indicates a location of the byte range in the URL of the GET request.

30. The method of claim 26, wherein providing comprises providing by a server device, wherein receiving comprises receiving by the server device, and wherein outputting comprises outputting by the server device.

31. The method of claim 26, wherein providing comprises providing by a proxy cache device, wherein receiving comprises receiving by the proxy cache device, and wherein outputting comprises outputting by the proxy cache device.

32. The method of claim 26, wherein the request comprises a first request for
the byte range of the representation of the multimedia content, the method further comprising: requesting the byte range of the representation from a server device; caching data for the byte range received from the server device; receiving a second, different request for the byte range of the representation; and
outputting, in response to the second request, the cached data for the byte range of the representation.

33. The method of claim 26, wherein the request comprises a first request and
wherein the byte range comprises a first byte range, the method further comprising: requesting the first byte range of the representation from a server device; caching data for the first byte range, received from the server device; receiving a second request including a second URL constructed according to the URL template and the byte range template, wherein the second URL of the second request specifies a second byte range of the representation of the multimedia content, wherein the second byte range follows the first byte range;

requesting the second byte range of the representation from the server device; and assembling a local copy of the representation using the cached data for the first byte range and data for the second byte range received from the server device.

34. The method of claim 26, wherein the manifest file indicates that the byte range template applies globally to all content distribution networks.

35. The method of claim 26, wherein the byte range template comprises one of a plurality of byte range templates, and wherein the manifest file indicates that each of the byte range templates applies to a respective one of a plurality of content distribution networks.

36. A device for sending information for multimedia data, the device comprising one or more processors configured to provide a manifest file for multimedia content, wherein the manifest file specifies a uniform resource locator (URL) template and a byte range template, wherein the URL template and the byte range template provide a template for forming a URL to include a byte range request within the URL, receive a GET request including a URL constructed according to the URL template and the byte range template, wherein the URL of the request specifies a byte range of a representation of the multimedia content, and wherein the GET request does not include a "Range:" header, and, in response to the request, output multimedia data of the representation corresponding to the byte range of the request.

37. The device of claim 36, wherein the manifest file further comprises information that specifies a plurality of byte ranges that can be requested for the representation, and wherein the byte range specified by the URL of the request comprises one of the plurality of byte ranges.

38. The device of claim 36, wherein the one or more processors are configured to provide a segment index data structure that specifies a plurality of byte ranges that can be requested for the representation, and wherein the byte range specified by the URL of the request comprises one of the plurality of byte ranges.

39. The device of claim 36, wherein the one or more processors are configured to receive an extension header within the request, wherein the extension header indicates a location of the byte range in the URL of the GET request.

40. The device of claim 36, wherein the device comprises at least one of a server device and a proxy cache device.

41. The device of claim 36, wherein the request comprises a first request for the byte range of the representation of the multimedia content, wherein the one or more processors are further configured to request the byte range of the representation from a server device, cache data for the byte range received from the server device, receive a second, different request for the byte range of the representation, and output, in response to the second request, the cached data for the byte range of the representation.

42. The device of claim 36, wherein the device comprises at least one of: an integrated circuit; a microprocessor; and a wireless communication device that includes the one or more processors.

43. A device for sending information for multimedia data, the device comprising:

means for providing a manifest file for multimedia content, wherein the manifest file specifies a uniform resource locator (URL) template and a byte range template, wherein the URL template and the byte range template provide a template for forming a URL to include a byte range request within the URL;

means for receiving a GET request including a URL constructed according to the URL template and the byte range template, wherein the URL of the request specifies a byte range of a representation of the multimedia content, and wherein the GET request does not include a "Range:" header; and means for outputting, in response to the request, multimedia data of the representation corresponding to the byte range of the request.

44. The device of claim 43, wherein the manifest file further comprises information that specifies a plurality of byte ranges that can be requested for the representation, and wherein the byte range specified by the URL of the request comprises one of the plurality of byte ranges.

45. The device of claim 43, further comprising means for providing a segment index data structure that specifies a plurality of byte ranges that can be requested for the representation, and wherein the byte range specified by the URL of the request comprises one of the plurality of byte ranges.

46. The device of claim 43, further comprising means for receiving an extension header within the request, wherein the extension header indicates a location of the byte range in the URL of the GET request.

47. The device of claim 43, wherein the request comprises a first request for the byte range of the representation of the multimedia content, further comprising:

means for requesting the byte range of the representation from a server device; means for caching data for the byte range, received from the server device; means for receiving a second, different request for the byte range of the representation; and means for outputting, in response to the second request, the cached data for the byte range of the representation.

48. A computer program product comprising a non-transitory computer-readable storage medium having stored thereon instructions that, when executed, cause one or more processors of a device for providing multimedia data to:

provide a manifest file for multimedia content, wherein the manifest file specifies a uniform resource locator (URL) template and a byte range template, wherein the URL template and the byte range template provide a template for forming a URL to include a byte range request within the URL;

receive a GET request including a URL constructed according to the URL template and the byte range template, wherein the URL of the request specifies a byte range of a representation of the multimedia content, and wherein the GET request does not include a "Range:" header; and output, in response to the request, multimedia data of the representation corresponding to the byte range of the request.

49. The computer program product of claim 48, wherein the manifest file further comprises information that specifies a plurality of byte ranges that can be requested for the representation, and wherein the byte range specified by the URL of the request comprises one of the plurality of byte ranges.

50. The computer program product of claim 48, further comprising instructions that cause the processor to provide a segment index data structure that specifies a plurality of byte ranges that can be requested for the representation, and wherein the byte range specified by the URL of the request comprises one of the plurality of byte ranges.

51. The computer program product of claim 48, further comprising instructions that cause the processor to receive an extension header within the request, wherein the extension header indicates a location of the byte range in the URL of the GET request.

52. The computer program product of claim 48, wherein the request comprises a first request for the byte range of the representation of the multimedia content, further comprising instructions that cause the processor to:
   request the byte range of the representation from a server device; cache data for the byte range, received from the server device; receive a second, different request for the byte range of the representation; and
   output, in response to the second request, the cached data for the byte range of the representation.

* * * * *